(12) United States Patent
Zhu et al.

(10) Patent No.: US 9,413,584 B2
(45) Date of Patent: Aug. 9, 2016

(54) BLIND PHASE-SHIFT KEYING (PSK) AND QUADRATURE AMPLITUDE MODULATION (QAM) IDENTIFICATION

(71) Applicant: University of Utah Research Foundation, Salt Lake City, UT (US)

(72) Inventors: Daimei Zhu, Salt Lake City, UT (US); V. John Mathews, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 14/680,722

(22) Filed: Apr. 7, 2015

(65) Prior Publication Data

US 2015/0350001 A1    Dec. 3, 2015

Related U.S. Application Data

(60) Provisional application No. 61/976,345, filed on Apr. 7, 2014.

(51) Int. Cl.
| | | |
|---|---|---|
| H04L 5/12 | (2006.01) | |
| H04L 27/38 | (2006.01) | |
| H04L 1/00 | (2006.01) | |
| H04L 27/00 | (2006.01) | |

(52) U.S. Cl.
CPC ........... *H04L 27/38* (2013.01); *H04L 1/0054* (2013.01); *H04L 27/0012* (2013.01)

(58) Field of Classification Search
CPC .... H04B 7/0413; H04B 7/0669; H04L 5/023; H04L 27/0012; H04L 1/0054; H04L 1/0631; H04L 27/2647

USPC ......... 375/375, 299, 279, 269, 316, 341, 347; 455/101, 103; 370/204, 794
See application file for complete search history.

(56) References Cited

U.S. PATENT DOCUMENTS

| | | | |
|---|---|---|---|
| 6,091,765 A | 7/2000 | Pietzold, III et al. | |
| 6,263,031 B1* | 7/2001 | Beidas | H04L 7/042 370/320 |
| 6,359,934 B1 | 3/2002 | Yoshida | |
| 6,580,705 B1 | 6/2003 | Riazi et al. | |
| 6,690,746 B1* | 2/2004 | Sills | G06K 9/00523 375/316 |
| 7,260,159 B2 | 8/2007 | Lee et al. | |
| 7,379,507 B2* | 5/2008 | Chen | H04B 1/0003 375/261 |
| 7,697,639 B2* | 4/2010 | Kim | H04L 27/22 375/259 |
| 8,085,882 B1* | 12/2011 | Su | H04L 27/0012 340/545.2 |
| 8,223,890 B1* | 7/2012 | Su | H04L 27/38 375/324 |
| 8,243,860 B1 | 8/2012 | Lee et al. | |
| 8,259,871 B2 | 9/2012 | Hosokawa et al. | |

(Continued)

*Primary Examiner* — Khanh C Tran
(74) *Attorney, Agent, or Firm* — Thorpe North & Wester, LLP

(57) ABSTRACT

Technology for blind phase-shift keying (PSK) and quadrature amplitude modulation (QAM) identification of a received radio frequency (RF) signal is disclosed. One method can include: uniform sub-sampling the received RF signal to eliminate a phase contribution from a carrier frequency of the received RF signal; and computing a likelihood function of observed phase differences of the sub-sampled received RF signal of a phase sequence for each PSK modulation type. Another method can include: non-uniformly sub-sampling the received RF signal for a distribution of signal amplitudes of the received RF signal; and computing a likelihood function of the signal amplitudes of the sub-samples of the received RF signal for each modulation type.

12 Claims, 25 Drawing Sheets

(56) References Cited

U.S. PATENT DOCUMENTS 8,358,723 B1 * 1/2013 Hamkins ............. H04L 27/0012
 375/341
9,137,066 B2 * 9/2015 Linn ................... H04L 27/3818
2005/0063487 A1 * 3/2005 Sayegh .............. H04B 7/18513
 375/316

* cited by examiner

BLIND PHASE-SHIFT KEYING (PSK) AND QUADRATURE AMPLITUDE MODULATION (QAM) IDENTIFICATION

BACKGROUND

A radio frequency (RF) signal can be modulated using various modulation schemes, such as phase-shift keying (PSK) and quadrature amplitude modulation (QAM). PSK modulation can include binary PSK (BPSK, phase reversal keying (PRK), or 2PSK), quadrature PSK (QPSK, quaternary PSK, quadriphase PSK, or 4-PSK) and 8PSK (8-PSK), and QAM can include 16QAM, 32QAM, 64QAM, 128QAM, 256QAM, 512QAM, and 1024QAM or higher order.

SUMMARY OF THE INVENTION

The disclosed technology describes a method for identifying different QAM (Quadrature Amplitude Modulation) and PSK (Phase-shift Keying) signals without information about a carrier frequency, symbol rate, pulse shaping or any other information pertaining to the transmitter. An amplitude likelihood-based method may be used to classify between QAM and PSK modulations and to identify different QAMs. Subsequently, a phase likelihood-based method may be applied to identify different PSK modulations. The likelihood-based method can identify a modulation type by maximizing a likelihood function of the amplitudes or the phase difference between nearby samples of the received signal. The technology can compute likelihood functions of the received signals for each of the candidate modulation types and identify the modulation type as a candidate modulation type for which the likelihood function is maximum.

The technology can include amplitude and phase likelihood-based methods for automatically identifying different quadrature amplitude modulations (QAMs) and different phase-shift keying (PSK) modulations. In one example method, an amplitude likelihood-based method can be used to classify between QAM and PSK modulations and to identify different QAMs. A phase likelihood-based algorithm can then be applied to identify different PSK modulations. The method does not need prior knowledge of carrier frequency or symbol rate and can identify modulation types at relatively low signal-to-noise ratio (SNR) using a small number of input samples. Pulse shaped signals can be identified using a small number of symbols. Further, the method works well at low signal-to-noise ratios.

There has thus been broadly outlined some features of the disclosure so that the detailed description that follows may be better understood, and so that the present contribution to the art may be better appreciated. Other features of the disclosure will become clearer from the following detailed description of the disclosure, taken with the accompanying drawings and claims, or may be learned by the practice of the disclosure.

BRIEF DESCRIPTION OF THE DRAWINGS

FIGS. 13a-13c show a probability that the system identifies the modulation type as one modulation type when the input signal is that modulation type, and FIGS. 13d-13f show a conditional probability that the input signal is one modulation type when the system identifies the input signal as that modulation type.

FIGS. 14a-14c show a probability that the system identify the modulation type as one modulation type when the input signal is that modulation type, and FIGS. 14d-14f show the conditional probability that the input signal is one modulation type when the system identifies the input signal as that modulation type.

FIGS. 15a-15b show a probability that the system identifies the modulation type as one modulation type when the input signal is that modulation type, and FIGS. 15c-15d show the conditional probability that the input signal is one modulation type when the system identifies the input signal as that modulation type.

Figure 1:
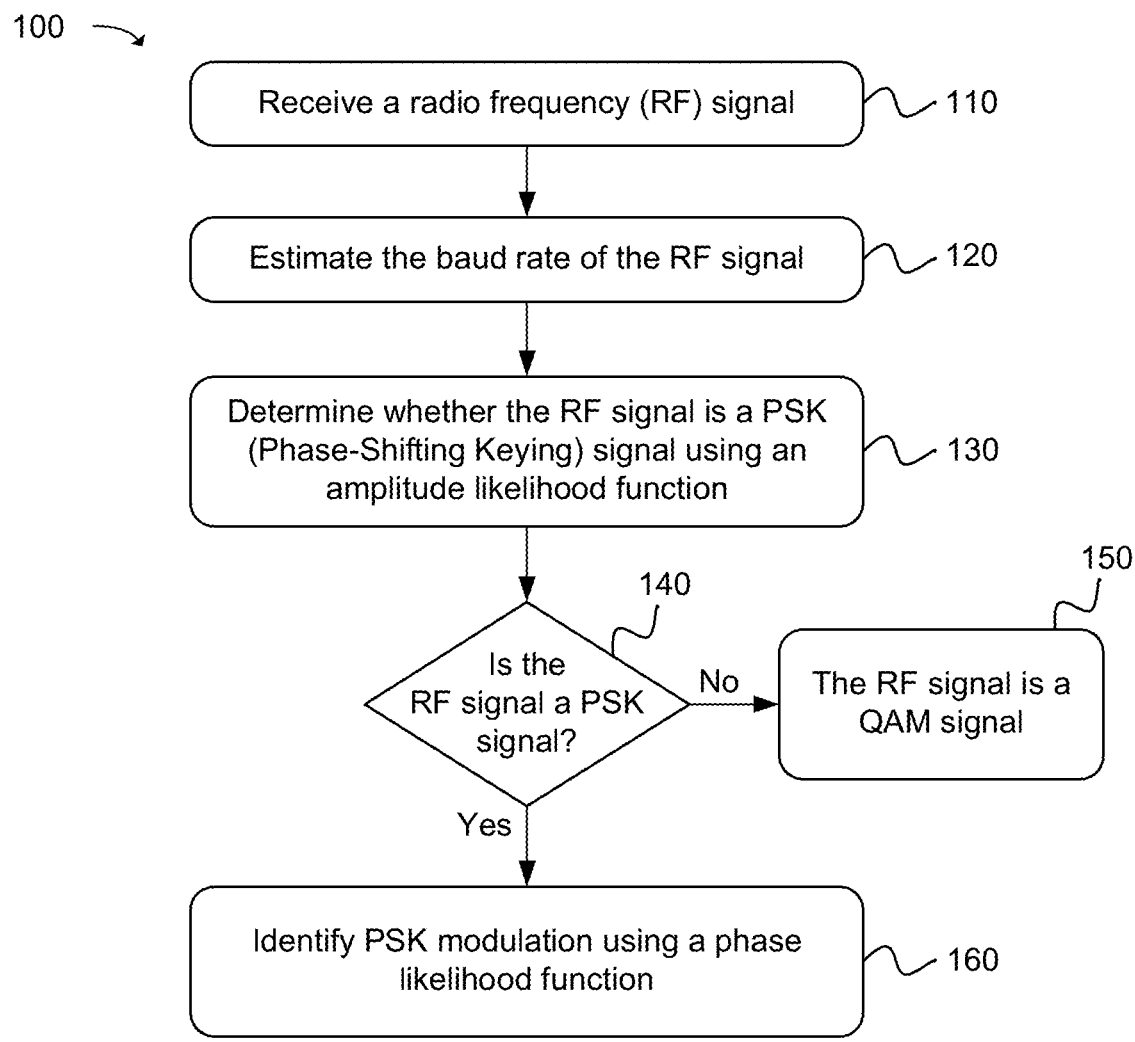
FIG. 1 is a flow diagram illustrating an example method for modulation identification for PSK signals.

The drawings merely depict exemplary embodiments of the disclosure, therefore, the drawings are not to be considered limiting of its scope. It will be readily appreciated that the components of the disclosure, as generally described and illustrated in the figures herein, could be arranged, sized, and designed in a wide variety of different configurations. Nonetheless, the disclosure will be described and explained with additional specificity and detail through the use of the accompanying drawings.

DETAILED DESCRIPTION

It is to be understood that this disclosure is not limited to the particular structures, process steps, or materials disclosed, but is extended to equivalents as would be recognized by those ordinarily skilled in the relevant arts. Alterations and further modifications of the illustrated features, and additional applications of the principles of the examples, which would occur to one skilled in the relevant art and having possession of this disclosure, are to be considered within the scope of the disclosure. It should also be understood that terminology employed herein is used for the purpose of describing particular embodiments only and is not intended to be limiting. The same reference numerals in different drawings represent the same element.

It must be noted that, as used in this specification and the appended claims, the singular forms "a," "an," and "the" include plural referents unless the context clearly dictates otherwise. Thus, for example, reference to "a wave" includes one or more of such elements, reference to "rows" includes reference to one or more of such features, and reference to "exposing" includes one or more of such steps.

DEFINITIONS

In describing and claiming the present disclosure, the following terminology will be used in accordance with the definitions set forth below.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof refers to the absence of the material or characteristic, or to the presence of the material or characteristic in an amount that is insufficient to impart a measurable effect, normally imparted by such material or characteristic.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.6 mm to about 0.3 mm" should be interpreted to include not only the explicitly recited values of about 0.6 mm and about 0.3 mm, but also include individual values and sub-ranges within the indicated range. Thus, included in this numerical range are individual values such as 0.4 mm and 0.5, and sub-ranges such as from 0.5-0.4 mm, from 0.4-0.35, etc. This same principle applies to ranges reciting only one numerical value. Furthermore, such an interpretation should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. Further, unless otherwise stated, the term "about" shall expressly include "exactly," consistent with the discussion above regarding ranges and numerical data.

In the present disclosure, the term "preferably" or "preferred" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the disclosure should be determined solely by the appended claims and their legal equivalents, rather than by the descriptions and examples given herein.

Examples of the Technology

A technology is described for blind modulation identification. Blind modulation identification may be modulation identification performed without a priori knowledge of a carrier frequency, symbol rate and other parameters of radio frequency (RF) signal transmission. Methods used for blind modulation identification may expect to receive an RF signal that is Quadrature Amplitude Modulated (QAM) or phase-shift keying (PSK) modulated, but does not assume any prior knowledge of a modulation order.

The technology can combine a QAM likelihood identification function with a PSK likelihood identification function to identify both QAMs and PSKs. As a result, a signal-to-noise ratio (SNR) searching range in an amplitude likelihood function for QAMs can be modified to achieve better performance as compared to similar methods. A non-uniform sub-sampling process can also be modified for the amplitude likelihood function. In phase likelihood functions, a constant phase contributed by a carrier frequency can be estimated.

FIG. 1 is a flow diagram illustrating an example method 100 for identifying a RF signal as a QAM type signal or a PSK type signal. Beginning in block 110, a RF signal may be received. Illustratively, the received RF signal may contain an additive band white Gaussian channel under which a general RF signal model for the received RF signal may be:

$$y(t) = \sum_k (S_k g_T(t - kT_b))e^{j2\pi f_c t} + N_0(t) \quad (1)$$

where $s_k$ is a complex symbol sequence with $s_k = a_k + jb_k$, where $a_k$ and $b_k$ are real and imaginary parts, $T_b$ is the symbol period, $g_T(t)$ is the square root raised cosine pulse shape filter with unknown roll off factor, $f_c$ is the carrier frequency, and $N_0$ is additive band white Gaussian noise. An assumption is made that $N_0$ is such that a sampled version of the noise is independent identically disturbed Gaussian signals with zero mean value and variance $\sigma^2$.

Applying Hilbert transformation to the received RF signals, a sampled version of the RF signal is given by:

$$y(t) = \sum_k (S_k gT(t - kT_b))e^{j2\pi f_c t} + N_0(t) \quad (2)$$

A RF signal model corresponding to an appropriately sampled version of the RF signal, as given by:

$$y(n) = \sum_k (S_k gT(nT_s - kT_b))e^{j2\pi f_c nT_s} + N_0(NT_s) \quad (3)$$

where $T_s$ is the sampling period and $N_0(nT_s)$ is the sampled version of noise, which is also a band-limited white Gaussian noise with flat spectrum. If assumed that the pulse shaping is such that the interference between the nearby symbols is negligible at the midpoint of each baud, let y(m) represent the mid-point of the mth symbol. Accordingly:

$$y(m) = s_m gT(0)e^{j2\pi f_c mT_b} + N_o(m) \quad (4)$$

where $N_0(m)$ is the noise sample at the mid-point of the $m^{th}$ symbol.

Having received the RF signal, as in block 120, a baud rate can be estimated for the received RF signal, as well as other characteristics, such as parameters in pulse shaping filter and noise, which may be used in determining a RF signal type (i.e., PSK or QAM). As an illustration, based on sampled version of the RF signal above, the RF signal spectrum can be expressed as:

$$S_{xx}(f) = P_s \|G_T(f)\|^2 + \sigma^2 \quad (5)$$

where $P_s$ is a clean signal power, $\|G_T(f)\|^2$ is the squared magnitude of the frequency response of a pulse shaping filter, and $\sigma^2$ a noise variance. As such, the frequency response of the matched filter, which can be the same pulse shaping filter in the RF signal, is the square root of the RF signal spectrum.

Assuming a square root raised cosine pulse shape for baud rate estimation, parameters such as baud rate, roll-off factor and noise variance can be estimated using least squares regression after estimating the spectrum using a method for estimating the power of a RF signal at different frequencies (e.g., Welch's method). A parameterized model of the squared frequency response of the root-raised cosine filter with parameter $\beta$ and symbol duration $T_b$ is given by:

$$G_T(f) = \begin{cases} T_b; & |f| \leq \frac{1-\beta}{2T_b} \\ \frac{T_b}{2}\{1 + \cos[\frac{\pi T_b}{\beta}(|f| - \frac{1-\beta}{2T_b})]\}; & \frac{1-\beta}{2T_b} \leq |f| \leq \frac{1+\beta}{2T_b} \\ 0; & \text{otherwise} \end{cases} \quad (6)$$

Unknown parameters $\beta$, $T_b$ and $\sigma^2$ can be estimated from the estimated power spectrum of the received RF signal.

When the RF signal is received, the identity of the RF signal may not be known. Therefore, as in block 130, a determination can be made whether the received RF signal is a PSK signal using an amplitude likelihood function. For example, an amplitude likelihood function can be used to classify a received RF signal as a QAM modulation or a PSK modulation. In addition, the amplitude likelihood function can be used to identify different types of QAM modulations. As in block 140, if the received RF signal is not classified as a PSK modulation, the as in block 150, the received RF signal is a QAM modulation. Otherwise the received RF signal is a PSK modulation and, as in block 160, the PSK modulation may be identified using a phase likelihood function, as described in relation to FIG. 4.

Figure 2:
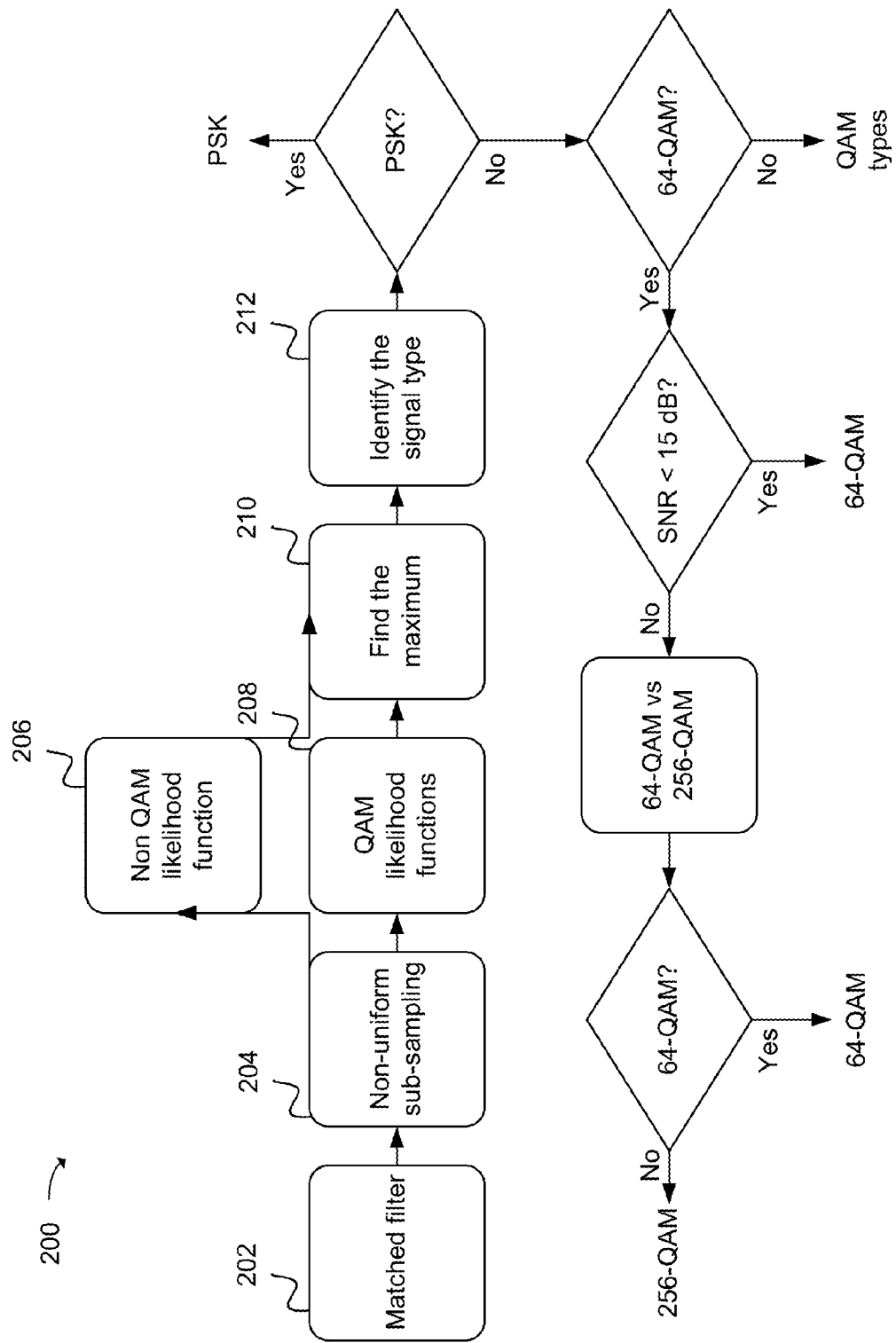
FIG. 2 is a flow diagram illustrating an example method for identifying an RF signal as a PSK modulation or a QAM modulation using an amplitude likelihood function.
Figure 3A:
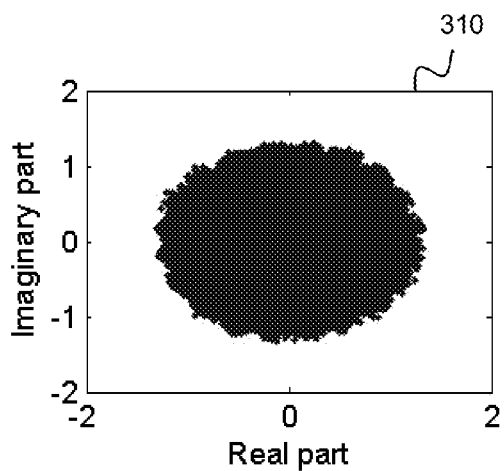
FIGS. 3a-3d are illustrations of scatter plots and amplitude distributions of QAM-16 received signals before and after sub-sampling in accordance with an example.
Figure 3B:
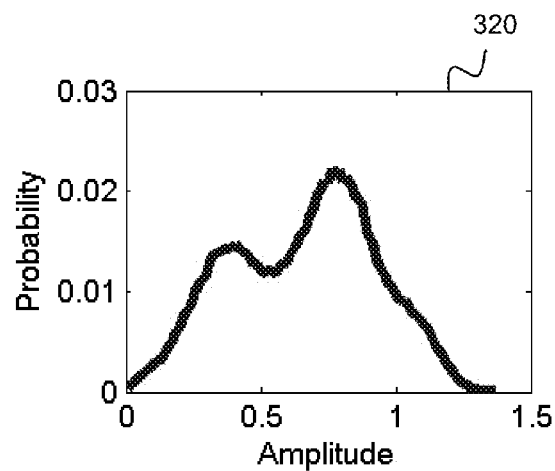
Figure 3C:
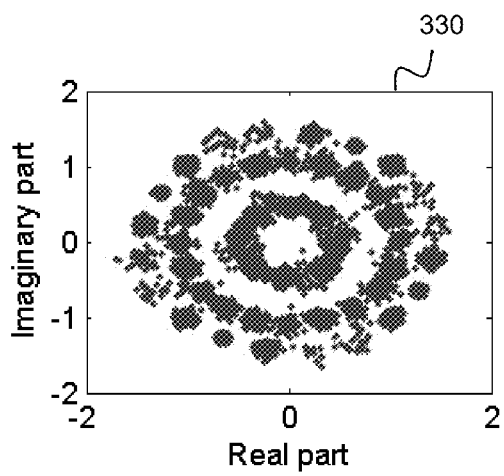
Figure 3D:
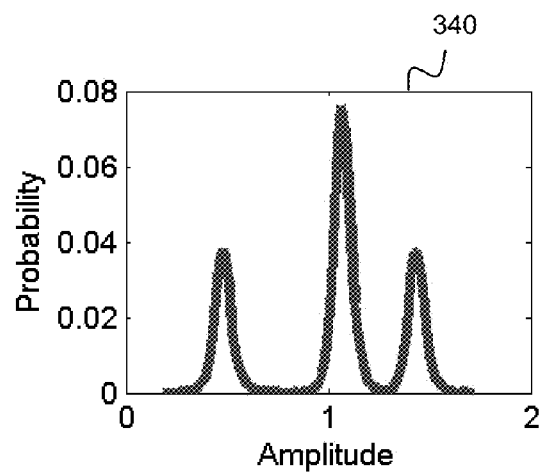

FIG. 2 is a flow diagram illustrating an example method 200 for identifying an RF signal as a PSK modulation or a QAM modulation using an amplitude likelihood function. As illustrated, a matched filter 202 can be applied to a received RF signal and non-uniform Sub-sampling 204 of the RF signal can be performed. As shown in Equation (5) above, magnitude response of a pulse shape filter can be estimated as a square root of an RF signal spectrum. Assuming the pulse shape filter is a square root raised cosine filter, the matched filter 202 can be designed as the same as the pulse shape filter applied in an RF signal. The non-uniform sub-sampling 204 can be based on a time recovery method known in the relevant art.

Illustratively, given the RF signal model in Equation (2), the ensemble average power of y(t) is:

$$p(t) = E|y(t)|^2 = P_s \sum_k |g(t - kT_b)|^2 \quad (7)$$

thus, the ensemble average power is periodic with period of $T_b$, which can be expressed as:

$$p(t+T_b) = p(t) \quad (8)$$

In some examples, a timing recovery method may be used that selects timing phases (e.g., samples) that have a maximum ensemble average power of a period of $T_b$. For example, the timing recovery method may be configured so that an assumption may be made that a ratio between a sampling rate and baud is integer. However, for a given blind received RF signal, the number of samples per baud may not always be integer. As a result, a time recovery method may be modified to a non-uniform sub-sampling 204 method based on the ensemble average power of each samples for the received RF signals. For example, the sampled RF signals as shown in Equation (3) use a baud number of samples per symbol $T=T_b/T_s$ instead of the baud rate $T_b$ to describe the non-uniform process.

In consideration of non-integer baud, the ensemble average power can be calculated by interpolating samples of received RF signals. Using coarse estimation of the baud, an evaluation of the ensemble average power of each samples shown in Equation (7) may be performed. As an example, the non-uniform sub-sampling 204 can be performed by starting with a sample with the maximum ensemble power among samples in the first several symbol durations. The next sample selected can be a sample with a peak value of the ensemble average power, as the result of a search over a small interval around the middle point of next baud based on last selected samples. Illustratively, a small interval may be selected to be the smallest integer larger than or equal to one-fourth of an estimated number of samples per baud. It is noted that the sub-sampling process described above may be non-uniform due to peak values that may not be equally spaced from one another.

Examples of the effects of matched filtering 202 and non-uniform sub-sampling 204 are illustrated in FIGS. 3a-3d. Shown is one example of an amplitude distribution of received RF signals before and after matched filtering 202 and non-uniform sub-sampling 204 for a 16-QAM signal. For example, the distribution of signal amplitudes of the received RF signal can include a weighted sum of distributions corresponding to different amplitude values. Parameters for the example RF signals shown in FIGS. 3a-3d are: SNR=20 dB; number of symbols $N_S$=10,000; $T_b$=$T_s$=20. The graph 310 shows a "constellation map" of a received RF signal. A histogram 320 of the RF signal amplitude is shown. Corresponding results after matched filtering 202 and sub-sampling are shown in the graph 330 and the histogram 340. Three groups of amplitude of the 16-QAM signals can be observed after matched filtering 202 and non-uniform sub-sampling 204, but the three groups cannot be observed in the received RF signal prior to matched filtering 202 and non-uniform sub-sampling 204. Consequently, the likelihood functions 206, 208 used for modulation identification of RF signals without pulse shaping can be used to identify pulse shaped RF signals after sub-sampling.

In one example, a QAM likelihood function 208 (e.g., an amplitude likelihood function) for different QAM signals can be based on the Probability Density Function (PDF) of the QAM signal amplitudes. For example, a modulation type of a received RF signal may be determined by letting there be N distinct amplitude values for the Mth modulation type and let $H_M$ represent the hypothesis that the Mth modulation type is the actual modulation type of the received RF signal. Further, letting the set $\{S_{M,i}; i=1, 2, \ldots, N\}$ represent the N distinct amplitude values and letting $W_M[i]$ be the probability of the ith amplitude value for the Mth modulation type. The PDF for RF signal amplitude R will then be:

$$P(R | H_M) = \sum_{i=1}^{N} (P(R | S_{M,i}) w_M[i]), \quad (9)$$

$$R \geq 0, = \sum_{i=1}^{N} w_M[i] \frac{R}{\sigma^2} e^{-\frac{R^2 + S_{M,i}^2}{2\sigma^2}} I_0\left(\frac{R S_{M,i}}{\sigma^2}\right)$$

where $P(R|S_{M,i})$ is the conditional PDF of the RF signal amplitude given that the modulation type is M and $I_0(.)$ is the zero order modified Bessel function of the first kind.

Illustratively, given $N_a$ amplitude values $R_1, R_2, \ldots, R_{Na}$ of the received RF signals, the conditional probability that $H_M$ is true is given by:

$$p(R_1, R_2, \ldots, R_{N_a} | H_M) = \prod_{i=1}^{N_a} P(R_i | H_M) \quad (10)$$

Combining Equation (10) with Equation (9), the log-likelihood function for the hypothesis $H_M$ can be expressed as:

$$l_M = \sum_{i=1}^{N_a} \ln\left( \sum_{i=1}^{N} w_M[i] \frac{R_i}{\sigma^2} e^{-\frac{\left(R_i^2 + S_{M,i}^2\right)}{2\sigma^2}} I_0\left(\frac{R_i S_{M,i}}{\sigma^2}\right) \right) \quad (11)$$

The QAM likelihood function (e.g., amplitude likelihood identification) can identify the RF signal modulation type as the corresponding hypothesis modulation type that maximizes the log-likelihood function in Equation (11).

In one example, a non QAM likelihood function may include additional modulation types resulting in an increase of the flexibility of the non QAM likelihood function to identify different QAM signals. For example, the modulation type for the non QAM likelihood function may have 50 amplitude groups that may be uniformly distributed from 1 to 50.

Because additional noise may be added to the RF signals in matched filtering 202 and non-uniform sub-sampling 204, and because identification performance may be very sensitive to the change of SNRs, the SNR searching range may be defined in the likelihood functions 206, 208 (e.g., the likelihood functions can be configured to compensate for noise power). For example, a SNR searching range may be refined in the likelihood functions 206, 208 as described later.

A maximum value 210 produced by the likelihood functions 206, 208 can be found and a modulation type of the received RF signal can be identified 212 based on the maximum value of the likelihood function calculations. Illustratively, modulation types can include PSK, 16QAM, 32QAM, 64QAM, 128QAM, 256QAM, 512 QAM, 1024 QAM, 2048 QAM and 4096 QAM, as well as other modulation types not specifically listed here. FIG. 2 illustrates an example flow of steps that can be used to identify a modulation type as PSK, 64-QAM or 256-QAM based on the maximum value of the likelihood function calculations.

Figure 4:
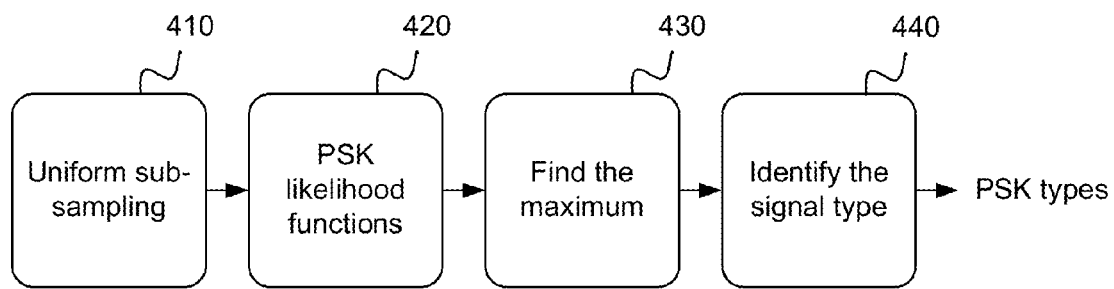
FIG. 4 is a flow diagram illustrating an example method for identifying different PSK types using PSK likelihood functions.
Figure 5A:
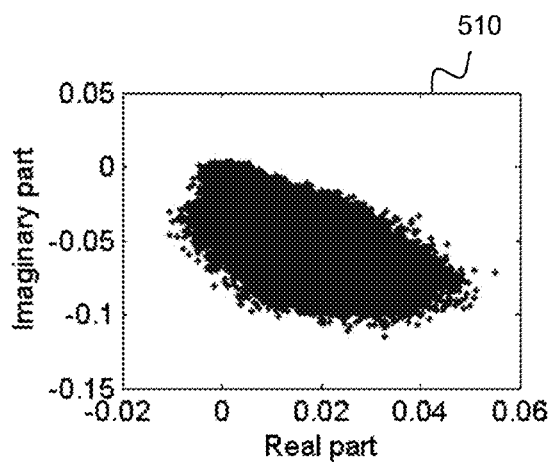
FIGS. 5a-5d are illustrations of scatter plots and amplitude distributions of Quadrature Phase-shift Keying (QPSK) signals before and after sub-sampling in accordance with an example.
Figure 5B:
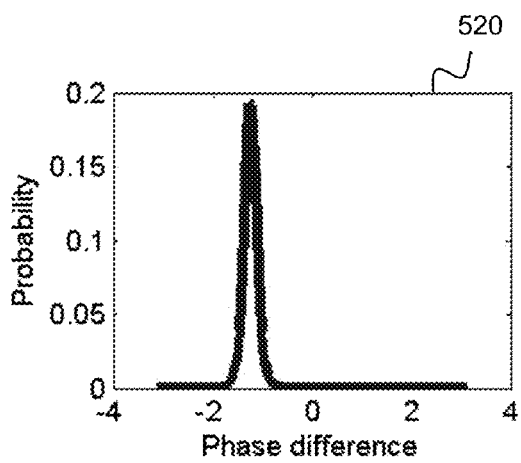
Figure 5C:
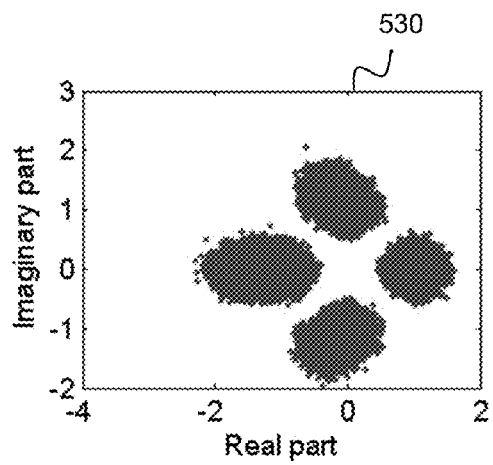
Figure 5D:
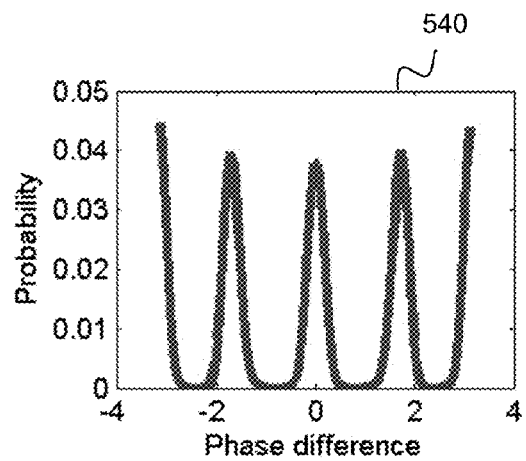

FIG. 4 illustrates an example method for identifying different PSK types using PSK likelihood functions (e.g., phase likelihood PSK identification). Starting in block 410, uniform sub-sampling may be used to sub-sample received RF signals. For example, RF signal models having high sampling rates like the RF signal model as described in Equation (3), nearby samples most often correspond to the same symbol, and the phase difference between nearby samples can be dominated by a fixed value contributed by the carrier frequency. This can be avoided by sub-sampling received RF signals such that nearby symbols may come from different bauds as shown in Equation (4). As such, received RF signals can be sub-sampled in a way that one sample in each estimated symbol duration is selected.

In one example, a starting sample may be selected as described earlier in relation to FIG. 2 (i.e., blocks 202, 204). Because phase values in each symbol duration may be substantially the same, more samples can be obtained by selecting different starting points for sub-sampling in one baud. After sub-sampling a received RF signal uniformly with a first starting sample, an adjacent sample of the first starting sample can be selected as a new starting point and samples may be selected in the same way as described above. In consideration of the effect of the inter-symbol interference, the number of the starting samples can be as many as half of the estimated symbol duration. Adjacent samples of sub-sampled sequences may be used in a likelihood function calculated based on the phase difference between adjacent samples.

FIGS. 5a-5d show the effects of sub-sampling on example phase difference sequences. A scatter plot 510 shows samples of a received RF signal. The graph 520 shows the phase difference between the adjacent samples. The impact of the carrier frequency is shown in both figures. The effect of the pulse shaping is also shown in the graph 520. The corresponding results after sub-sampling by the estimated symbol duration are shown in the scatter plot 530 and the graph 540. Consequently, the likelihood functions derived for modulation identification of RF signals can be applied without pulse shaping to identify pulse shaped RF signals after sub-sampling.

Returning to FIG. 4, as in block 420, the samples obtained from sub-sampling may be provided to PSK likelihood functions. The likelihood function for PSK signals may be based on the PDF of the phase difference between nearby samples of the received RF signals. Illustratively, let there be N distinct phase difference values $\theta_s$ between symbols for the Mth modulation type. Also, let the set $\{\theta_s(M, i); i=1, 2, \ldots, N\}$ represent the N distinct phase difference values $\theta_s$, and let $w_M[i]$ be the probability of the ith phase difference value for the Mth modulation type and let $\theta_s$ be the constant phase contributed from the carrier frequency. The PDF for RF signal phase difference $\theta$ will then be:

$$P(\theta | H_M) = \sum_{i=1}^{N_P} P(\theta | \theta_s(M, i))w_M[i], -\pi \leq \theta \leq \pi, \quad (12)$$

$$= \sum_{i=1}^{N} \int_0^{\frac{\pi}{2}} \left\{ \left[ 1 + \frac{S}{2}(1 + \cos(\theta - \theta_s(M, i) - \theta_c)\sin2\beta) \right] \right.$$

$$\left. \sin2\beta e^{-\frac{1}{2}S(1-\cos(\theta-\theta_s(M,i)-\theta_c)\sin2\beta)} \right\} \frac{w_M[i]}{2\pi} d\beta$$

Given $N_p$ phase difference values $\theta_1, \theta_2, \ldots, \theta_{N_P}$ of the received RF signals, the PSK likelihood function for $H_M$ is:

$$P(\theta_1, \theta_2, \ldots \theta_{N_p} | H_M) = \quad (13)$$

$$\prod_{j=1}^{N_p} \sum_{i=1}^{N} \int_0^{\frac{\pi}{2}} \left\{ \left[ 1 + \frac{S}{2}(1 + \cos(\theta_j - \theta_s(M, i) - \theta_c)\sin2\beta) \right] \right.$$

$$\left. \sin2\beta e^{-\frac{1}{2}S(1-\cos(\theta_j-\theta_s(M,i)-\theta_c)\sin2\beta)} \right\} \frac{w_M[i]}{2\pi} d\beta$$

The PSK log-likelihood function for determining the modulation types is given by:

$$l_M = \sum_{j=1}^{N_p} \ln(P(\theta_j | H_M)) \quad (14)$$

As in block 430, by finding the maximum of the log-likelihood functions in Equation (14) under different hypothesis, then as in block 440, the PSK types of the received RF signals can be identified as the corresponding hypothesis. Instead of searching over the range of $[-\pi, \pi]$ in the phase likelihood functions, a constant phase contributed by the carrier frequency can be estimated from a histogram of the phase difference between nearby samples after sub-sampling. Because 0 phase may be one phase group between nearby symbols for each modulation type, the constant phase contributed from the carrier frequency may shift the 0 phase group to the constant. Each phase group should have maximum probabilities in the histogram of the phase difference between nearby symbols in a range from $-\pi$ to $\pi$. Therefore, the constant phase can be estimated as the maximum in the histogram for the phase difference of nearby samples after sub-sampling.

Figure 6:
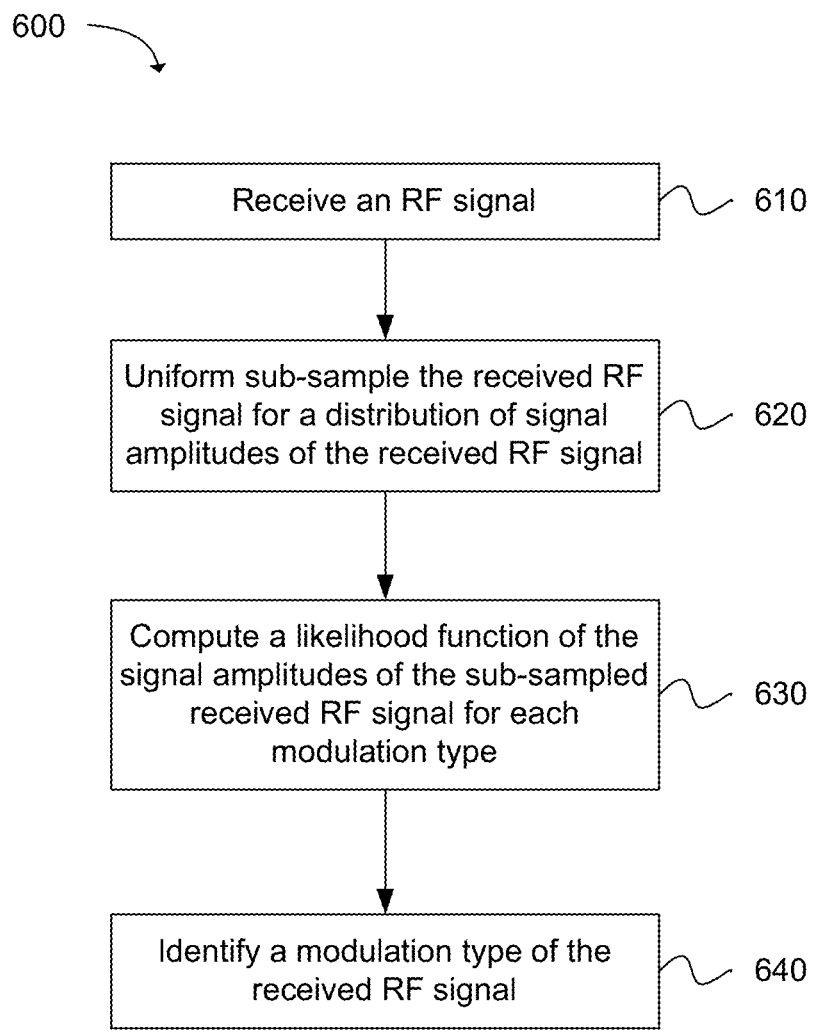
FIG. 6 is a flow diagram that illustrates an example method for blind PSK and QAM identification using an identification detector.
Figure 7A:
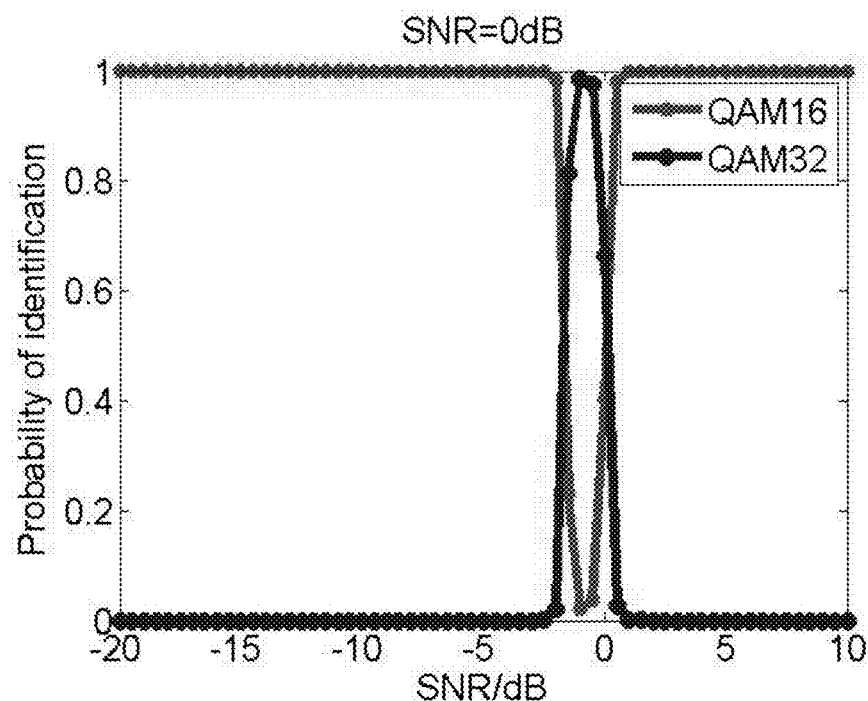
FIGS. 7a-7f are illustrations of theoretical probability examples of correct modulation identification for 16-QAM and 32-QAM signals at different signal-to-noise ratios (SNRs) according to a mismatch of the true SNR.
Figure 7B:
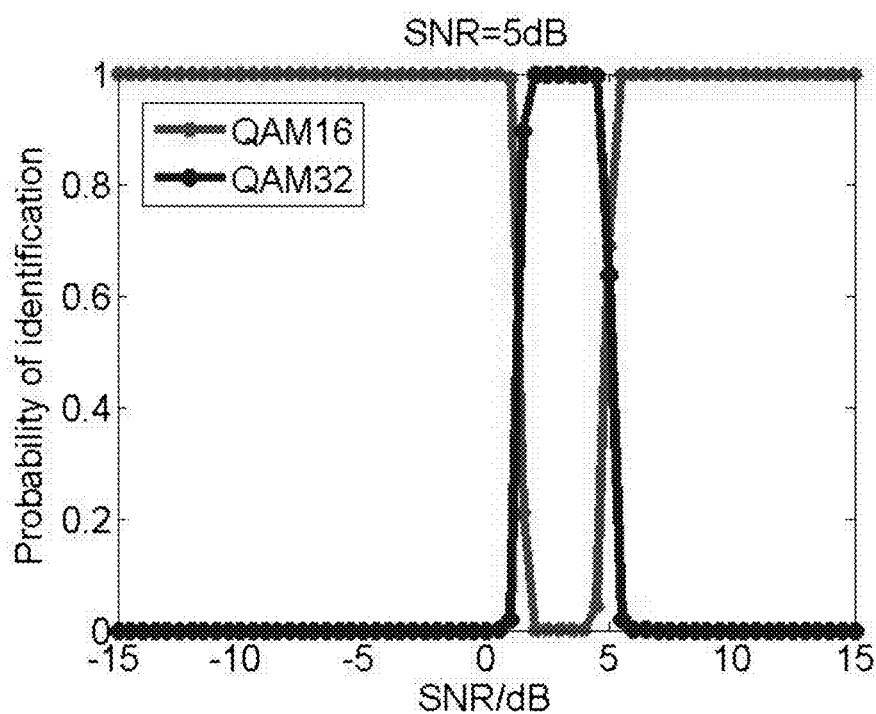
Figure 7C:
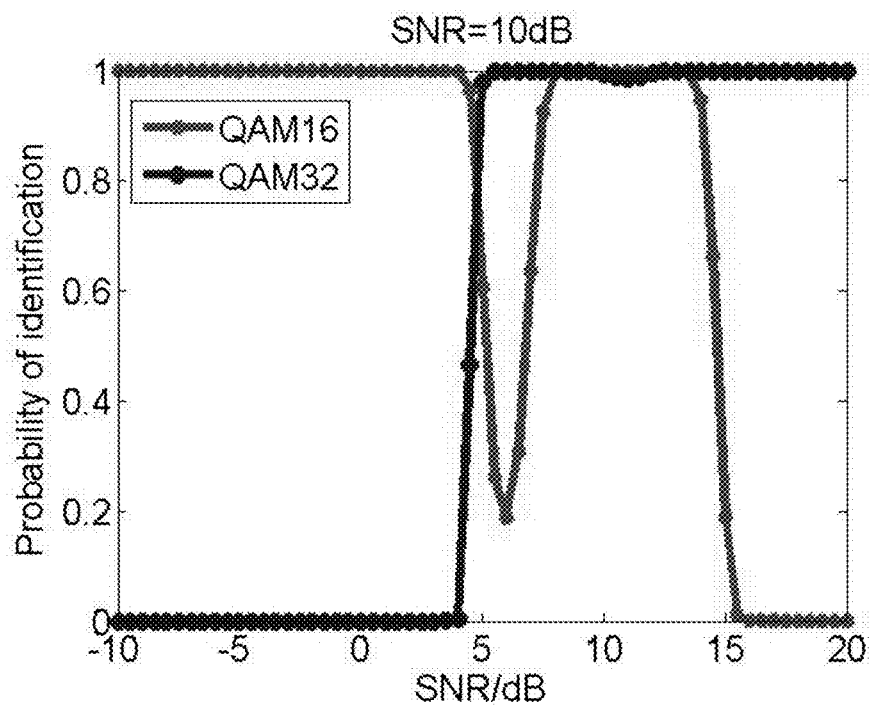
Figure 7D:
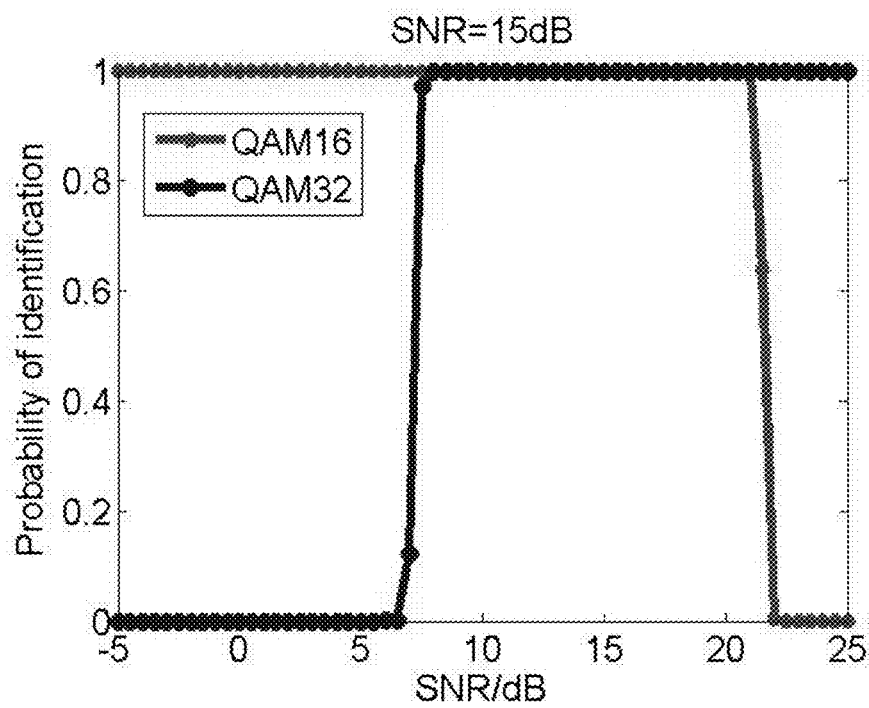
Figure 7E:
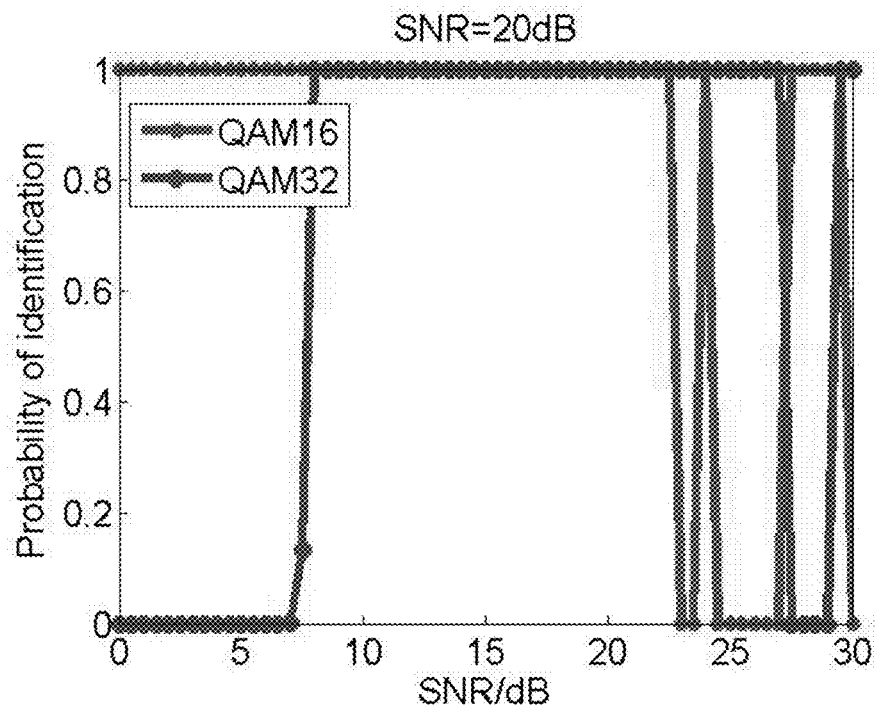
Figure 7F:
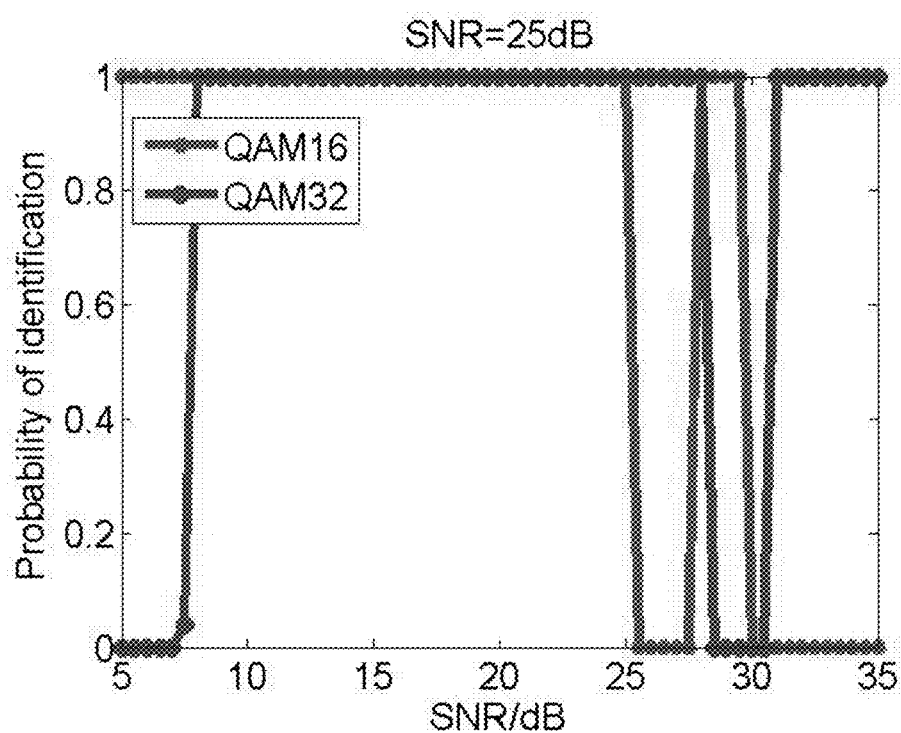
Figure 8A:
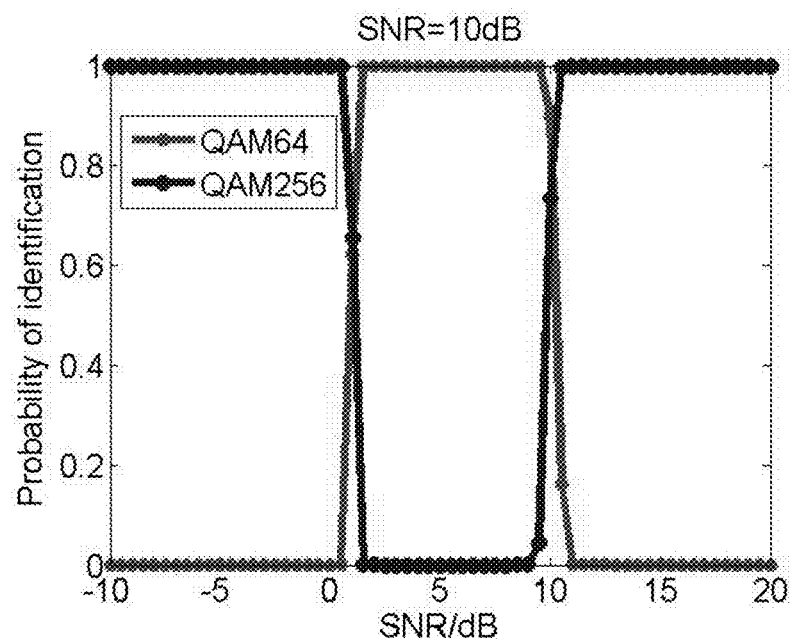
FIGS. 8a-8f are illustrations of theoretical probability examples of correct modulation identification with different SNRs due to SNR variations.
Figure 8B:
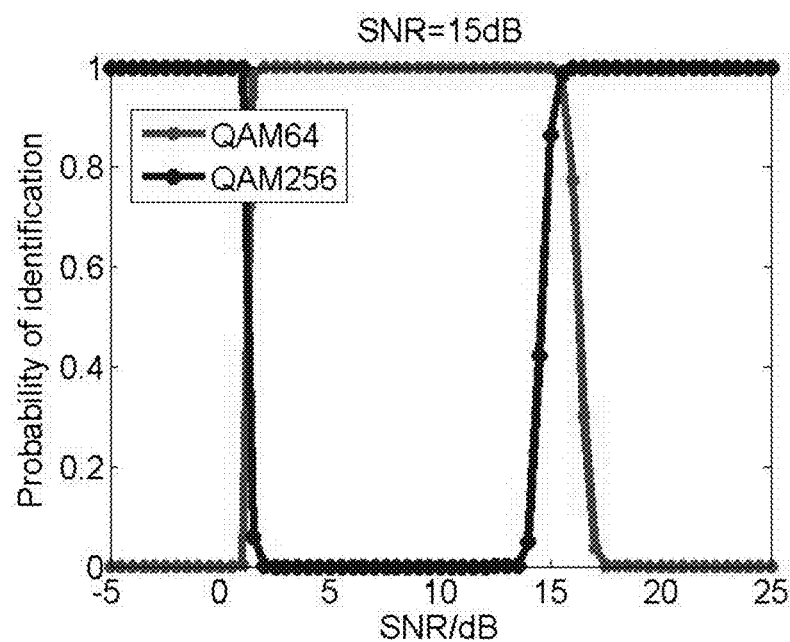
Figure 8C:
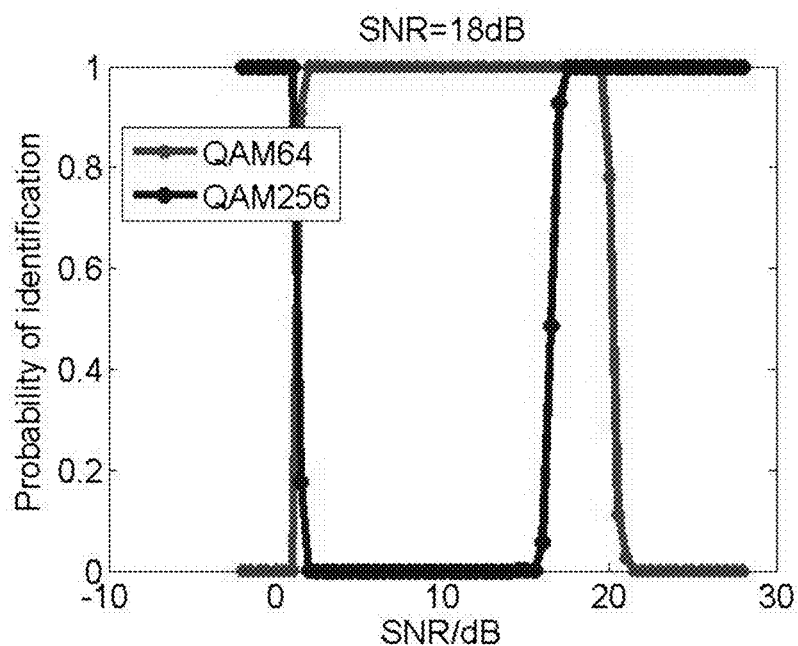
Figure 8D:
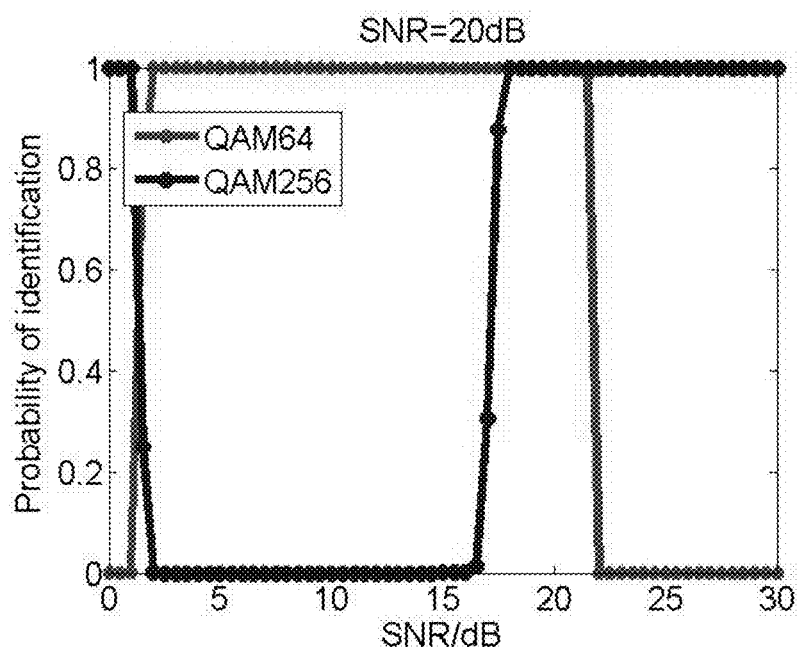
Figure 8E:
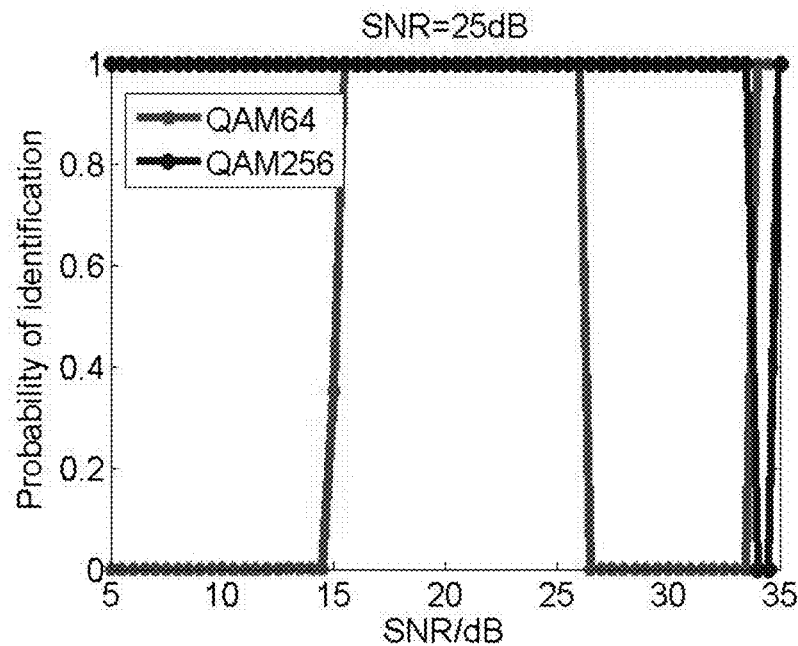
Figure 8F:
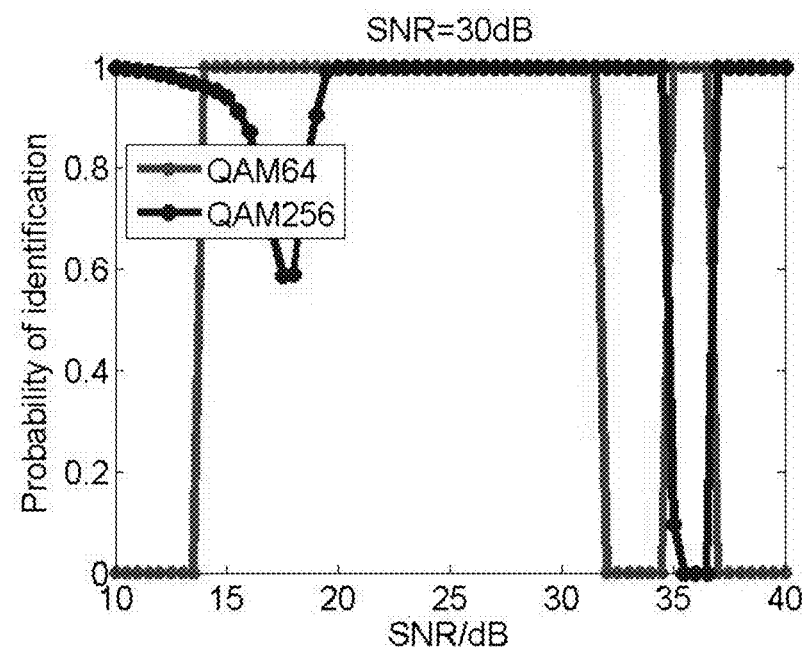

FIG. 6 is a flow diagram illustrating an example method for blind modulation identification of an RF signal. Starting in block 610, an RF signal may be received at a PSK and QAM identification detector. The PSK and QAM identification detector may have computer circuitry that may include a processor and memory configured to, as in block 620, uniform sub-sample the received RF signal for a distribution of signal amplitudes of the received RF signal.

As in block 630, a likelihood function can then be used to compute signal amplitudes of the sub-sampled received RF signal for each modulation type. Illustratively, modulation types may include PSK modulation types (e.g., binary PSK (BPSK), quadrature PSK (QPSK), and 8PSK) and QAM modulation types (e.g., 16 QAM, 32 QAM, 64 QAM, 128 QAM, 256 QAM, 512 QAM, 1024 QAM, 2048 QAM and 4096 QAM).

In some examples, a determination of whether a single signal amplitude results from the likelihood function may be made, and in the case of a single signal amplitude, a uniform sub-sampling of the received RF signal may be performed. A likelihood function can then be computed based on observed phase differences of the sub-samples of the received RF signal of a phase sequence for each PSK modulation type.

As in block 640, a modulation type of the received RF signal can be identified. In one example, a maximum value of the likelihood function calculations can be found and a modulation type of the received RF signal can be identified based on the maximum value of the likelihood function calculations.

Performance Analysis of the Examples of the Technology

Theoretical analysis for amplitude and phase likelihood functions is presented. In the following section, a theoretical analysis is presented for the performance of a likelihood function that identifies a modulation. More specifically, the probability of successful identification for each modulation type is presented. Successful identification for modulation M is the case when the likelihood function under the hypothesis of modulation M is larger than that under all the other hypotheses. Let $p(\text{success}|H_M)$ represent the successful identification for modulation M, which can be expressed as:

where the summation is over all hypotheses other than M.

$$p(\text{success} | H_M) = \sum_{m \neq M} p(l_M > l_m | H_M) p(l_m | H_M) \quad (15)$$

The successful identification for the algorithm is then written as:

$$p(\text{success}) = \sum_{m \neq M} p(\text{success} | H_M) p(H_M) \quad (16)$$

where the summation is over all the hypotheses.

A. Theoretical Calculation of the Probability of Successful Identification

In order to calculate $p(\text{success}|H_M)$, the PDF of the likelihood functions $l_M$ is found. Due to the complexity of Equations (11) and (14), the statistics of $l_M$ can be difficult to derive. As such, the PDF of $l_M$ can be assumed to be Gaussian distributed using the central limit theorem when the number of RF signal samples is large. Obtaining the mean and variance is a direct way to derive the Gaussian distribution.

Assuming the likelihood functions are independent of each other, the calculation $p(l_M > l_m | H_M)$ can be performed to obtain $p(\text{success}|H_M)$. Let $\Delta_{l_m}$ be defined as the difference of two likelihood functions under different hypotheses when the input RF signal is modulation M, which can be written as:

$$\Delta_{lM} = \sum_i \Delta_l(s_i) = \sum_i \{l_M(s_i)\} \quad (17)$$

where $s_i$ is the ith signal sample. For amplitude likelihood functions, s is the amplitude of the RF signal. Similarly in phase likelihood functions, s is the phase difference of the nearby RF signal samples.

Then, $$p(l_M > l_m | H_M) = p(\Delta_{lM} > 0) \quad (18)$$

let $\mu_{lm}$ represent the mean of $\Delta_{lm}$ and $\Omega_{lm}$ represent the variance of $\Delta_{lm}$. Analytical expressions for the mean:

$$\mu_{lM} = \quad (19)$$

$$\int_{s_1}\int_{s_2} \cdots \int_{s_{N_s}} [\Delta_{lM} p(s_1, s_2, \ldots, s_{N_s} | H_M)] ds_1 ds_2 \ldots ds_{N_s} =$$

$$N_s \int_s \Delta_l(s) p(s|H_M) ds$$

where $N_s$ is the number of RF signal symbols.

$$\Omega_{lM} = \int_{s_1}\int_{s_2}\cdots\int_{s_{N_s}}\left[\left(\sum_i \Delta_l(s_i) - \mu_l\right)^2 p(s_1, s_2, \ldots, s_{N_s}|H_M)\right] \quad (20)$$

$$ds_1 ds_2 \ldots ds_{N_s}$$

$$= N_s \int_s [(\Delta_l(s))^2 p(s|H_M)] ds - \frac{\mu_l^2}{N_s}$$

The details of the mean and variance can be found in the appendix I.

Consequently, $$p(l_M > l_m | H_M) = \quad (21)$$

$$p(\Delta_{lM} > 0) = \int_0^\infty \frac{1}{\sqrt{2\pi\Omega_{lM}}} e^{-(\Delta_{lM} - \mu_{lM})^2/2\Omega_{lM}} = Q\left(-\frac{\mu_{lM}}{\Omega_{lM}}\right)$$

where $Q(\cdot)$ is the Q-function.

B. Performance Variation for Amplitude Likelihood-Based QAM Identification Method In the process of applying amplitude-based likelihood functions to identify different QAM modulations, matched filtering and non-uniform sub-sampling change the RF signal model used in the theoretical analysis. As a result, the simulation results do not match well with the theoretical results. In the following two subsections provides analysis of the possible reasons.

1) SNR Difference after Matched Filtering

For QAM likelihood functions, a pre-process step can be performed before applying the QAM likelihood function to the RF signal. The SNR is changed after pre-processing, which is shown as the following.

The SNR for the received RF signal in Equation (2) can be expressed as:

$$SNR_{bf} = \frac{P_s}{T_b} \frac{\int_{-\infty}^{\infty} |G_T(f)|^2 df}{\sigma^2} \quad (22)$$

where $P_s$ is the power of the symbols, $T_b$ is number of samples per symbol, and $G_T(f)$ is the frequency response of the pulse shape filter.

After applying the matched filtering, the SNR of the RF signal model will become:

$$SNR_{af} = \frac{P_s}{T_b} \frac{\int_{-\infty}^{\infty} |G_T(f)|^2 df}{\sigma^2 \int_{-\infty}^{\infty} |G_T(f)|^2 df} \quad (23)$$

Combining Equation (22) and (23), we can obtain the ratio of the SNR before and after the matched filtering, which is:

$$SNR_r = \frac{SNR_{af}}{SNR_{bf}} \frac{\int_{-\infty}^{\infty} |G_T(f)|^4 df}{(\int_{-\infty}^{\infty} |G_T(f)|^2 df)^2} \quad (24)$$

The pulse shape filter is assumed to be a square-root raised-cosine filter. Applying Equation (6) to Equation (24), the ratio of the SNR before and after the matched filtering becomes:

$$SNR_r = \left(1 - \frac{\beta}{4}\right) T_b \quad (25)$$

Equation (25) shows that the SNR difference is related to the roll-off factor and number of samples per symbol, both of which are estimated in the baud estimation. Thus the SNR in QAM likelihood functions should be the estimated SNR plus the SNR difference. However, the SNRs in PSK likelihood functions are the estimated SNRs because there is no matched filter process in the algorithm.

2) Effect of SNR Estimation Error

The non-uniform sub-sampling process can add more noise to the RF signals because the samples are optimized at each baud. The lth samples by non-uniform sampling becomes:

$$y(l) = s_k g(lT_s - kT_b) e^{j2\pi f_c lT_s} + N_0(lT_s) \quad (26)$$

where $l = k*T_b/T_s + \Delta l$; $\Delta l$ is optimized based on the non-uniform sampling process. If $\Delta l$ equals to 0, the samples have been chosen correctly and the RF signal model is the same as that in the likelihood functions. But when $\Delta l$ does not equal 0, the amplitude of the RF signal model can be simplified as:

$$|y(l)| = |s_k||g(\Delta l)| + |n(l)| = |s_k||g(0) + |n(l)| \quad (27)$$

The additional term $|\Delta g(0)|$ is small variation from $|g(0)|$ and can be regarded as additional noise added to the RF signal model. When the number of samples is large, the number of samples satisfy Gaussian distribution using central limit theorem. In this way, the SNR of the RF signal after non-uniform sampling can have a small variation compared with the SNR before. Here the theoretical probability of identification can be considered if there is error between estimated SNR and true SNR As an example, the derivation below considers only two modulation types, which are 16-QAM and 32-QAM.

Let $H_{16}$ represent the hypothesis for 16-QAM and $H_{32}$ represent the hypothesis for 32-QAM. The difference of the likelihood functions under these two hypotheses for a specific SNR is:

$$\Delta_l(S) = \sum_i \Delta_l(s_i) = \sum_i \{l(s_i, S | H_{16}) - l(s_i, S | H_{32})\} \quad (28)$$

where l is the likelihood function, $s_i$ is the ith signal sample and S is the value of SNR.

Similar as in Section III-A, theoretical probability of identification due to the mismatch of SNR also satisfies the Gaussian distribution and can be estimated by mean and variance. The mean and variance can be evaluated similar as in Section III-A.

Let $S_r$ be the estimated SNR, the mean for the probability of identification due to the mismatch of SNR if the input RF signal is 16-QAM can be expressed as:

$$\mu_{l,16} = \int_{s_1}\int_{s_2} \cdots \int_{s_{N_s}} [\Delta_l(S_r) p(s_1, s_2, \ldots, s_N | H_{16}, S)] \quad (29)$$

$$ds_1 ds_2 \ldots ds_{N_s}$$

$$= N_s \int_s \Delta_l(s, S_r) p(s | H_{16}, S) ds$$

where $N_s$ is the number of RF signal symbols.

$$\Omega_{l,16} = \int_{s_1}\int_{s_2} \cdots \int_{s_{N_s}} \left[\left(\sum_i \Delta_l(s_i, S_r) p(s_1, s_2, \ldots, s_{N_s} | H_{16}, S)\right)\right] \quad (30)$$

$$ds_1 ds_2 \ldots ds_{N_s}$$

$$= N_s \int_s [(\Delta_{l,16}(s, S_r))^2 p(s | H_{16}, S)] ds - \frac{\mu_{l,16}^2}{N_s}$$

Subsequently, the probability of correct identification of 16-QAM due to the mismatch of SNR is:

$$p_{16} = \quad (31)$$

$$p(\Delta_{l,16} > 0) = \int_0^\infty \frac{1}{\sqrt{2\pi\Omega_{l,16}}} e^{-(\Delta_{l16} - \mu_{l,16})^2/2\Omega_{l,16}} = Q\left(-\frac{\mu_{l,16}}{\Omega_{l,16}}\right)$$

A similar derivation can be made for 32-QAM signals. FIGS. 7a-7f show six examples of theoretical probability of correct modulation identification for 16-QAM and 32-QAM signals at different SNRs when there is mismatch off the true SNR. The six examples shown in FIGS. 8a-8f are similar except for 64-QAM versus 256-QAM. FIGS. 7a-7f and FIGS. 8a-8f provide several observations. First, the performance of the amplitude likelihood function is sensitive to SNR changes when SNR is lower than 10 dB. Second, to obtain 100% identification rate for all modulation types, the estimated SNR should have a variation in a range that is close to the true SNRs. Finally, the variation range for different SNRs is different. Higher SNRs will have wider range.

As explained earlier in this section, non-uniform sub-sampling adds more noise into the RF signal that cannot be estimated accurately. Therefore, the method can be modified as follows. A different SNR searching range can be selected in the likelihood functions of each hypothesis for different estimated SNRs. By finding the maximum value among these likelihood functions, the SNR can be obtained. The SNR searching range is defined in table I.

Also, performance for 64-QAM signals versus 256-QAM signals is different from other RF signals, which can be seen in FIGS. 8a-8f. The SNR range is different from that in FIGS. 7a-7f. As a consequence, an additional step can be added to identify between 64-QAM and 256-QAM. If a RF signal is identified as the RF signal type as 64-QAM and the SNR is higher than 10 dB, we will change the SNR searching range in the likelihood functions for 64-QAM and 256-QAM as shown in table II.

TABLE I

SNR SEARCHING RANGE

| SNR(dB) | Searching range(dB) |
|---|---|
| ≤10 | [−1:1] + SNR |
| ≤15 | [−2:2] + SNR |
| ≤20 | [−6:0] + SNR |
| ≥20 | [14:20] |

TABLE II

SNR SEARCHING RANGE

| SNR(dB) | Searching range(dB) |
|---|---|
| ≤15 | [−2:2] + SNR |
| ≥15 | [17:22] |

IV. Performance Evaluation

In this section, the performance of the likelihood blind modulation identification methods is first demonstrated as the comparison between theoretical and simulated results of successful identification. Then the comparison of the likelihood blind modulation identification methods with other two is presented. Finally, shown is the probability of correctly identifying each modulation type under several SNR conditions in the simulation. Also, provided is the performance of the likelihood blind modulation identification methods in noise environments that are different from the assumed Gaussian model.

A. Comparison Between Theory and Simulation

In this section, the theoretical identification results as described earlier are compared with the simulation results for PSK and QAM signals.

Figure 9A:
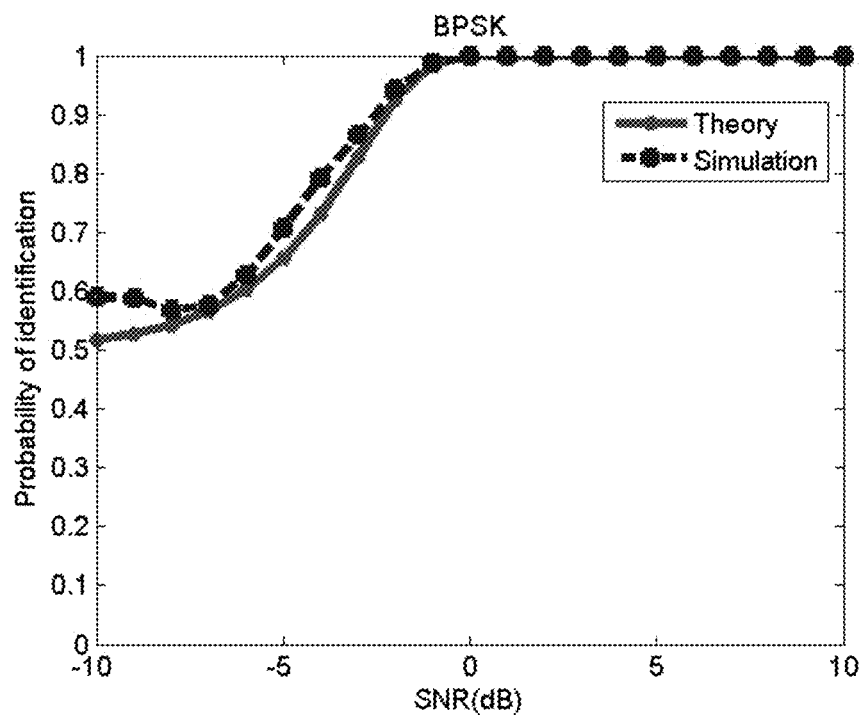
FIGS. 9a-9b illustrate a comparison between theoretical identification and simulation results for Binary Phase-shift Keying (BPSK) and QPSK signals with different SNRs and a number of symbols: 1000.
Figure 9B:
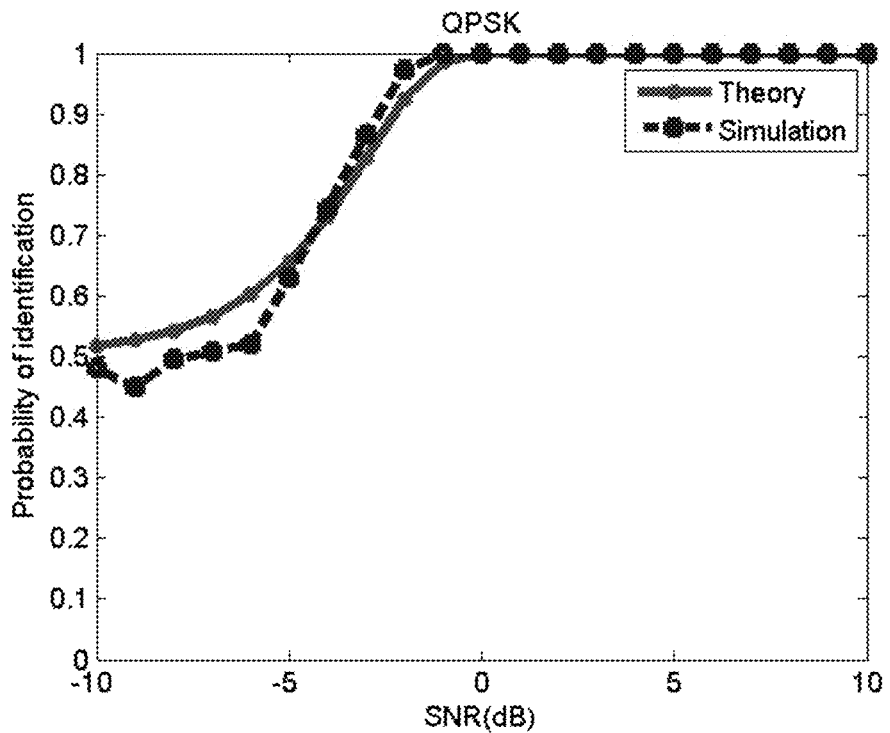
Figure 10A:
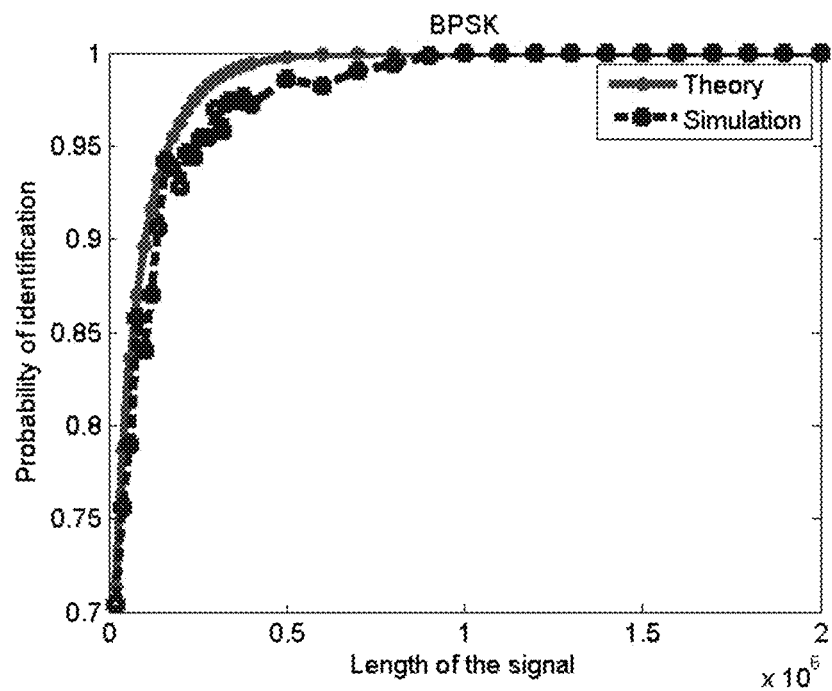
FIGS. 10a-10b illustrate a comparison between theoretical identification and simulation results for BPSK and QPSK signals of different signal length with SNR=−5 db.
Figure 10B:
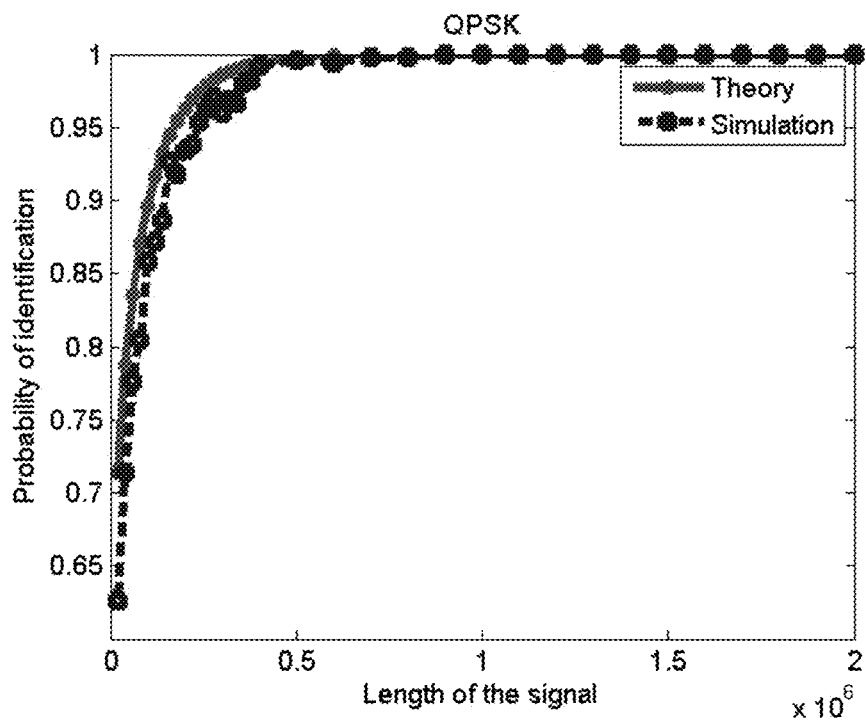

1) Comparison for PSK signals: FIGS. 9a-9b show two examples of comparisons between theoretical probability of correct identification and simulation results when identifying between BPSK with QPSK signals under different SNRs with 1000 symbols. FIG. 9a is the results for correctly identifying BPSK signals, and FIG. 9b is the results for correctly identifying QPSK signals. FIGS. 10a-10b show two examples of comparisons between theory and simulation for identifying BPSK and QPSK signals with different signal length when SNR equals to −5 dB. FIG. 10a is the results for correctly identifying BPSK signals, and FIG. 10b is the results for correctly identifying QPSK signals.

FIGS. 9a-9b and 10a-10b demonstrate that the simulation results for the phase likelihood method matched well with the theoretical predictions.

2) Comparison for QAM signals: The comparisons for 16-QAM and 32-QAM signals in this section are examples for the other QAM signals. As we mentioned earlier, the SNR after matched filtering and non-uniform sub-sampling can change the SNRs in the received RF signals. The SNR due to the matched filtering can be added using the estimated baud rate and roll-off factor. However, the SNR change due to the non-uniform sub-sampling may be difficult to estimate directly from the sub-sampled RF signals. As a result, simulated RF signals were trained and an estimated SNR for the RF signals were obtained after matched filtering and non-uniform sub-sampling. The additional noise variance due to the non-uniform sub-sampling is calculated in the simulation as shown in Equation (27). Table III shows the comparisons of the original SNRs in the RF signal, the SNRs after matched filtering and the SNRs after matched filtering and non-uniform sub-sampling.

TABLE III

SNR COMPARISONS

| | SNR (dB) | | | | | | | | | | |
|---|---|---|---|---|---|---|---|---|---|---|---|
| | −10 | −9 | −8 | −7 | −6 | −5 | −4 | −3 | −2 | −1 | 0 |
| SNR after matched filtering | 2.43 | 3.43 | 4.43 | 5.43 | 6.43 | 7.43 | 8.43 | 9.43 | 10.43 | 11.43 | 12.43 |
| SNR after mached filtering and non-uniform sub-sampling | 1.72 | 2.63 | 3.51 | 4.38 | 5.21 | 6.03 | 6.80 | 7.53 | 8.20 | 8.85 | 9.44 |

As shown, the SNR after matched filtering and non-uniform sub-sampling decreases by 1-3 dB as compared with the SNRs after matched filtering. As a result, in the following comparisons between simulation and theoretical results, the SNRs in theoretical results are decreased by 2 dB in respect to the theoretical SNRs after matched filtering.

FIGS. 11a-11b and 12a-12b show comparisons between theory and simulation for identifying between 16-QAM and 32-QAM signals. The SNRs shown in FIGS. 11a-11b and 12a-12b are SNRs prior to performing matched filtering.

Figure 11A:
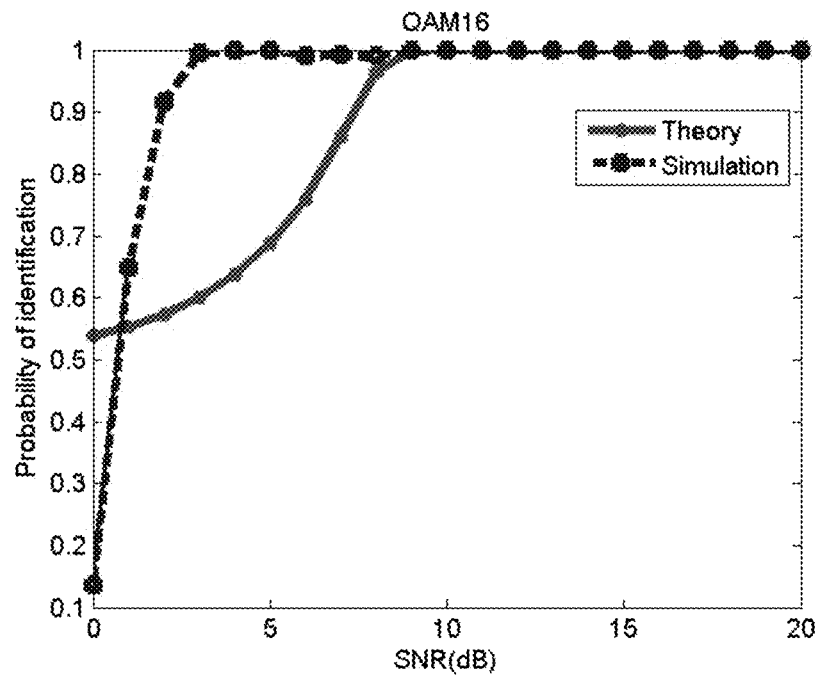
FIGS. 11a-11b illustrate of a comparison between theoretical identification and simulation results for 16-QAM and 32-QAM signals with different SNRs and a number of symbols: 10,000.
Figure 11B:
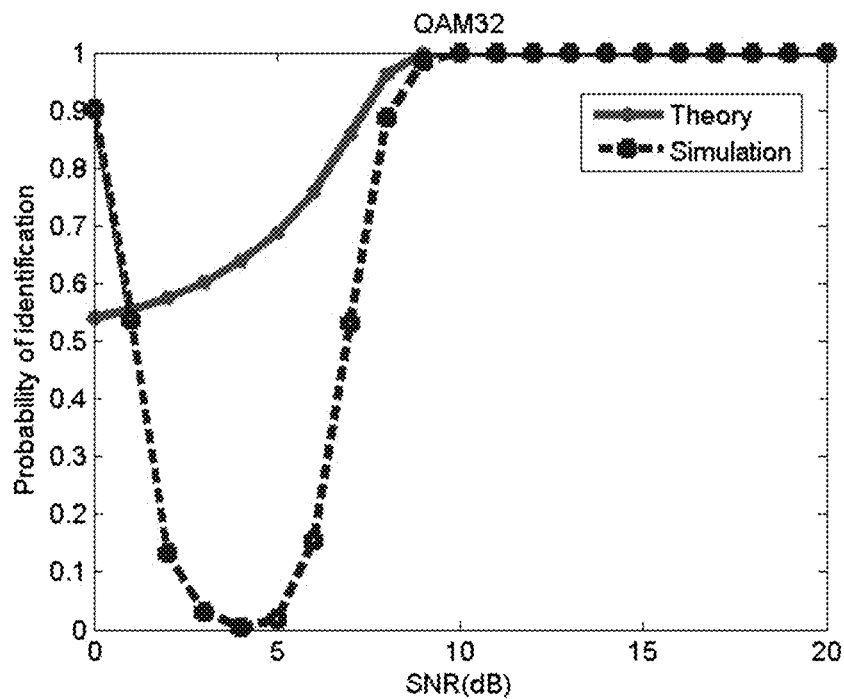
Figure 12A:
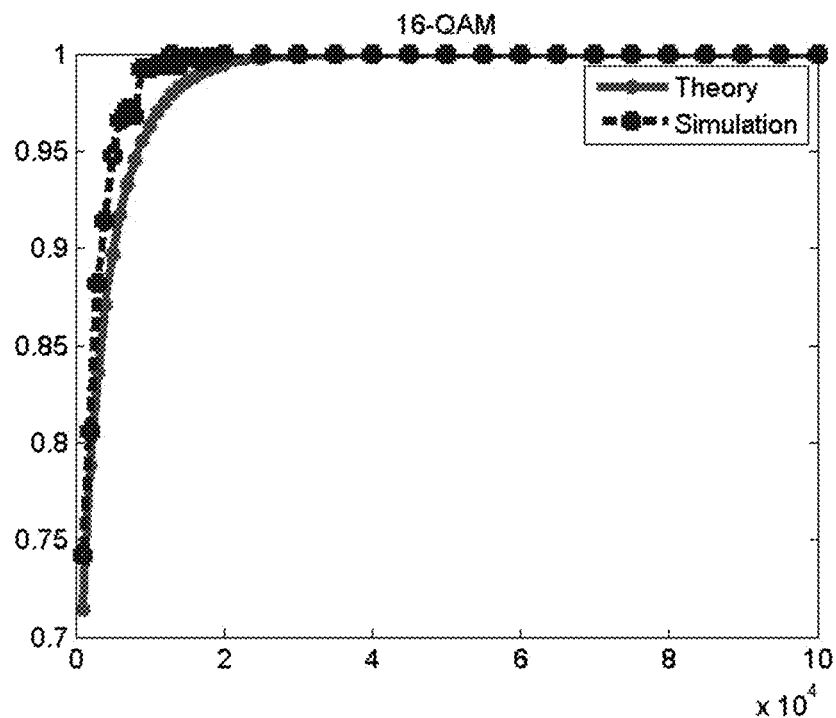
FIGS. 12a-12b illustrate comparison between theoretical identification and simulation results for 16-QAM and 32-QAM signals with SNRs=−2 dB and a number of symbols: 10,000.
Figure 12B:
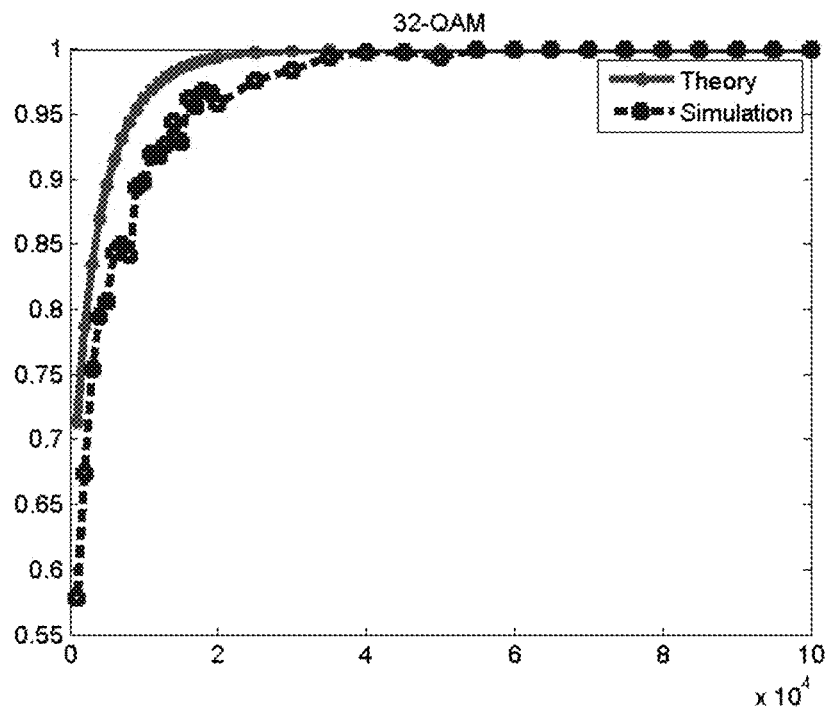

FIG. 11a shows the results for correctly identifying 16-QAM signals with different SNRs and FIG. 11b shows the results for correctly identifying 32-QAM signals. FIG. 12a shows the results of correct identification when SNR=−2 dB for 16-QAM signals with different signal length, and FIG. 12b shows the results of correct identification for 32-QAM signals. Shown in FIGS. 11a-11b and 12a-12b is that the simulation did not match with that for the theoretical results for lower SNRs. However, as mentioned earlier, the small variation of SNRs may result in wrong identification results for lower SNRs.

B. Comparison with Other Methods

Figure 13A:
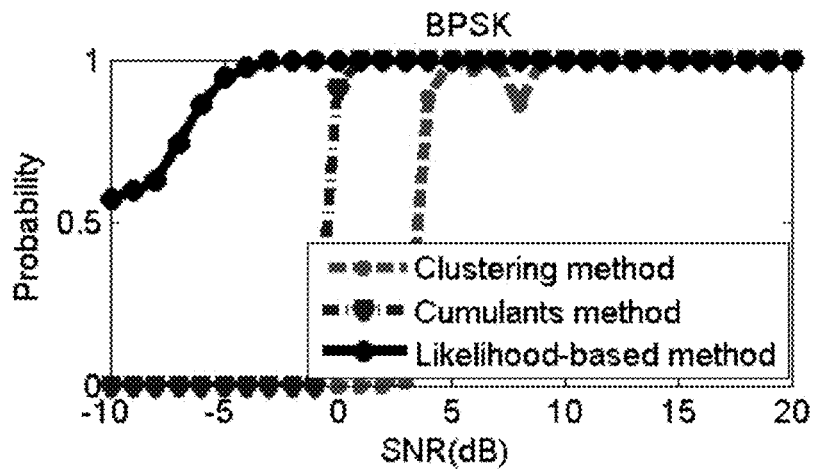
FIGS. 13a-13f are illustrations of comparisons between methods for identifying BPSK, QPSK, and 8PSK.
Figure 14A:
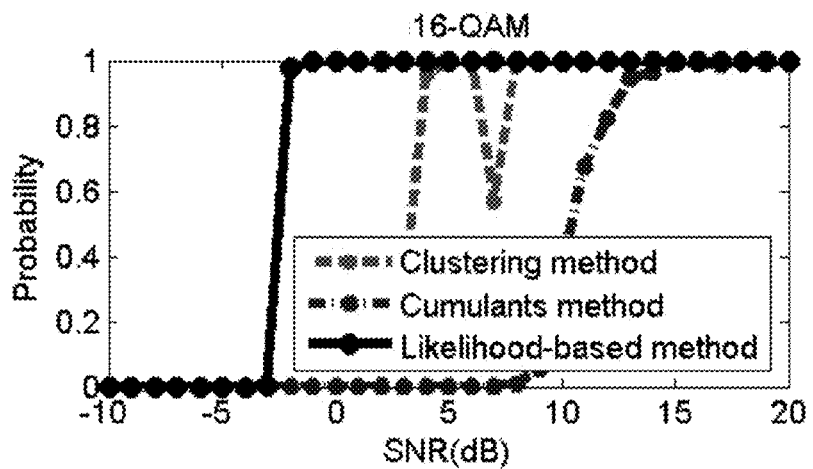
FIGS. 14a-14f are illustrations of comparisons between methods for identifying 16, 32, and 64-QAM.
Figure 15A:
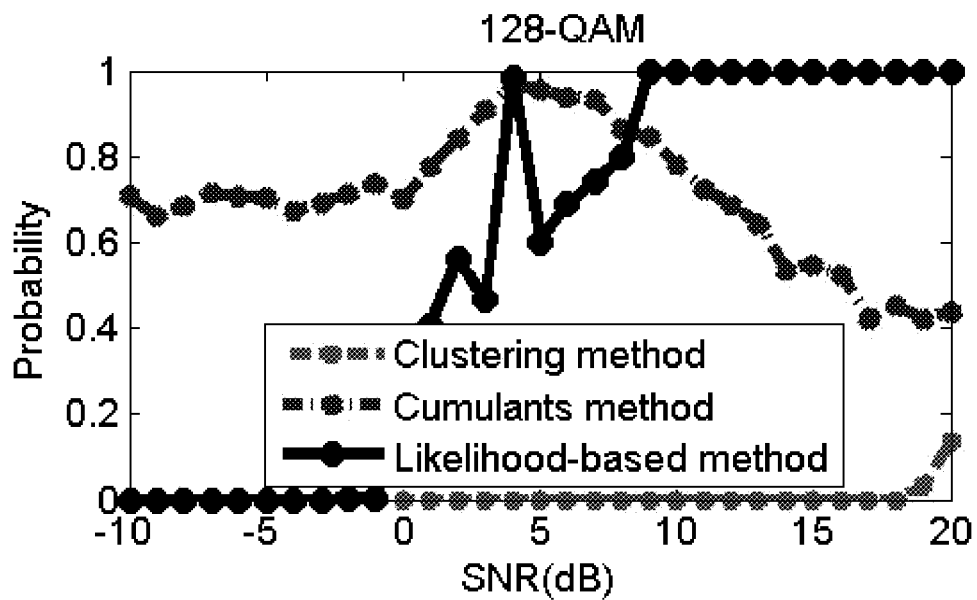
FIGS. 15a-15d are illustrations of comparison between methods for identifying 128 QAM and 256 QAM.

In this section, two other modulation identification methods, a clustering method and a cumulant-based method are compared with the likelihood blind modulation identification method disclosed herein. The comparisons between the clustering method, the cumulant-based method and the likelihood blind modulation identification method are shown in FIGS. 13a, 14a and 15a for each modulation type as the probability of correct identification for RF signals with different modulation types under Gaussian noise.

The simulation environments are those described in Section C below.

Figure 13B:
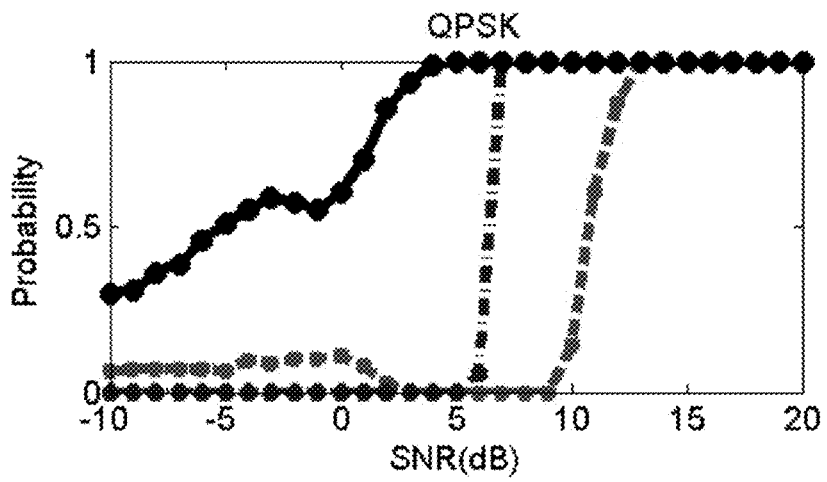
Figure 13C:
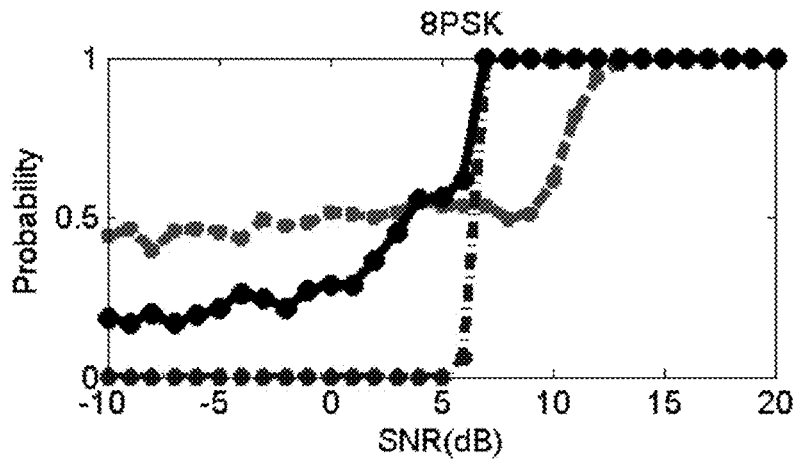
Figure 13D:
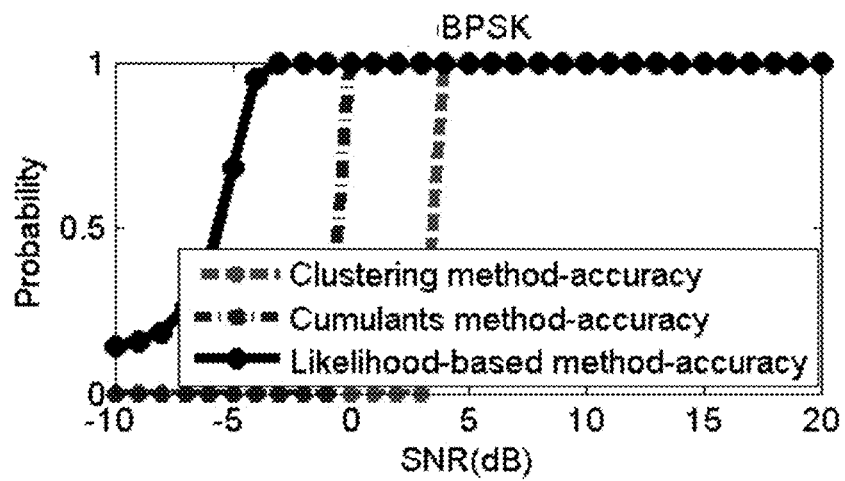
Figure 13E:
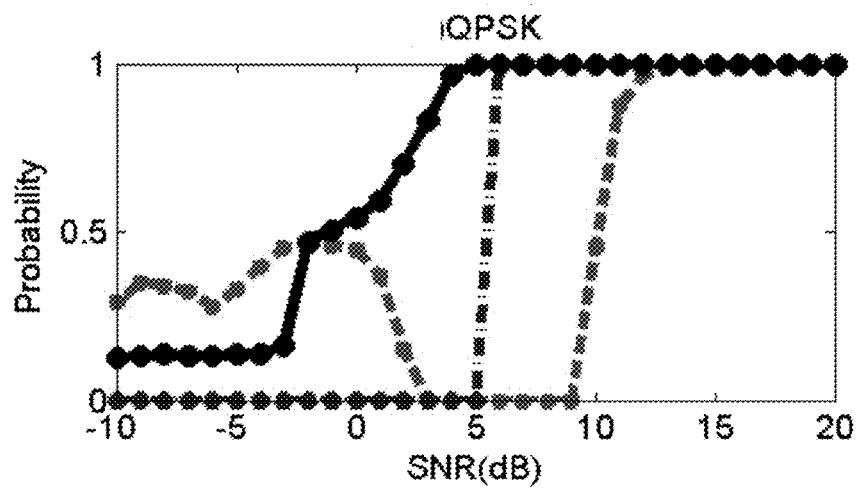
Figure 13F:
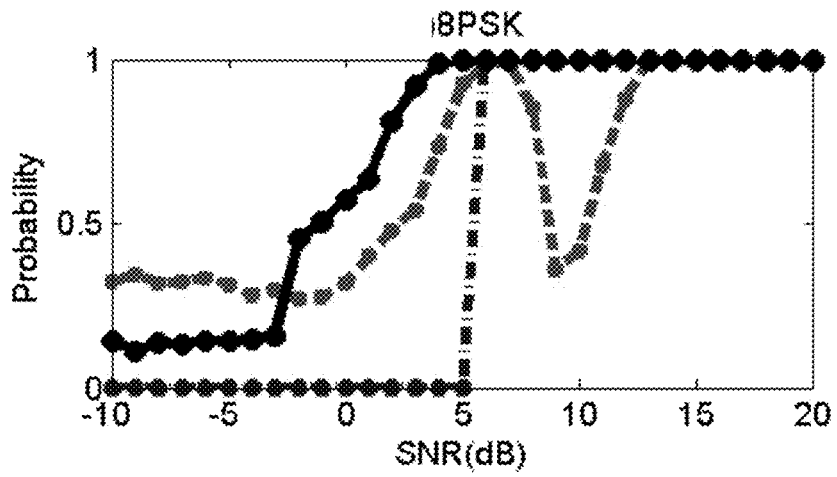
Figure 14B:
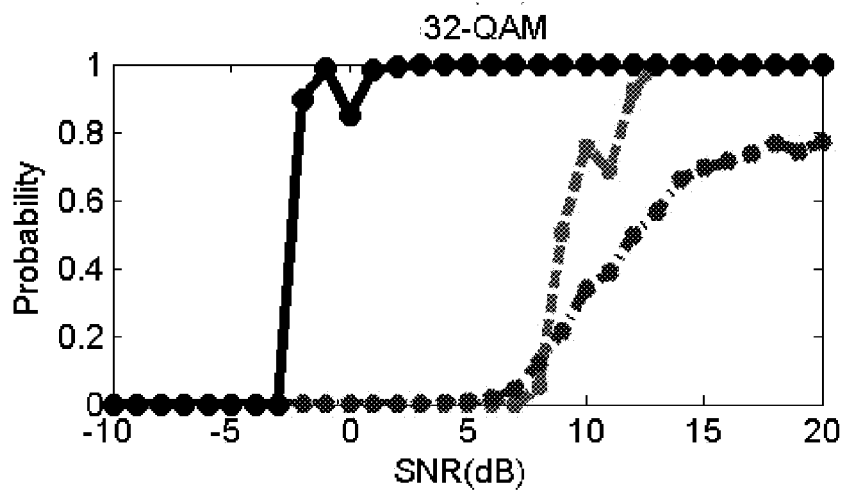
Figure 14C:
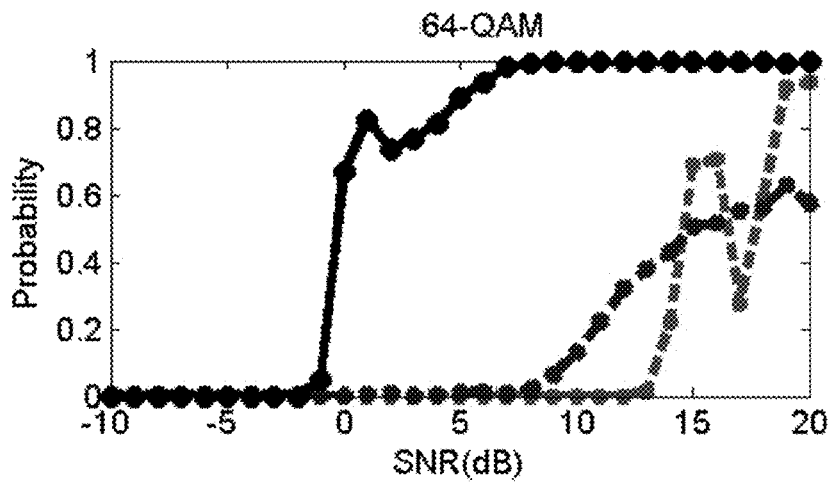
Figure 14D:
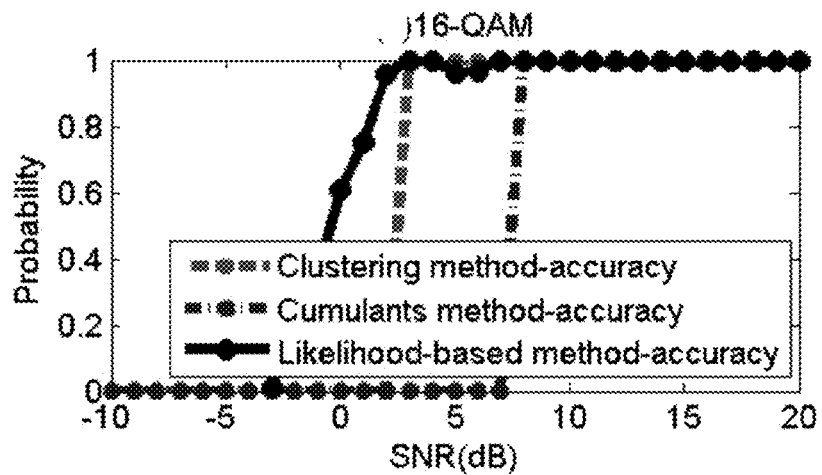
Figure 14E:
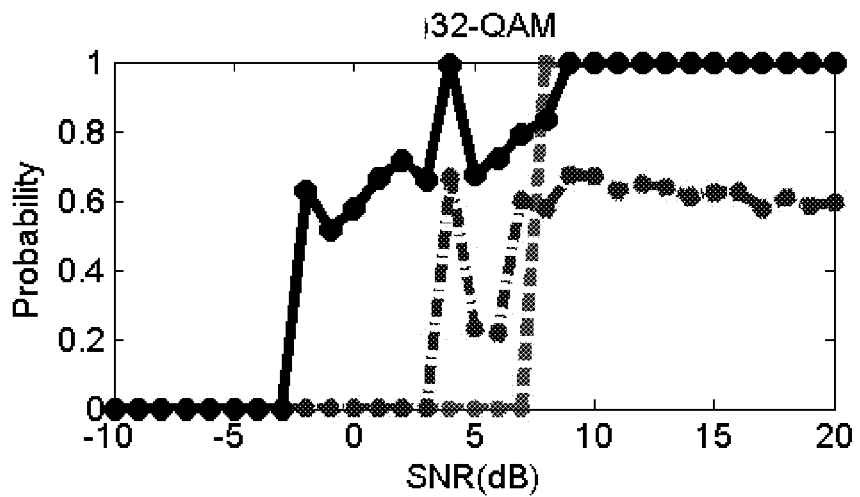
Figure 14F:
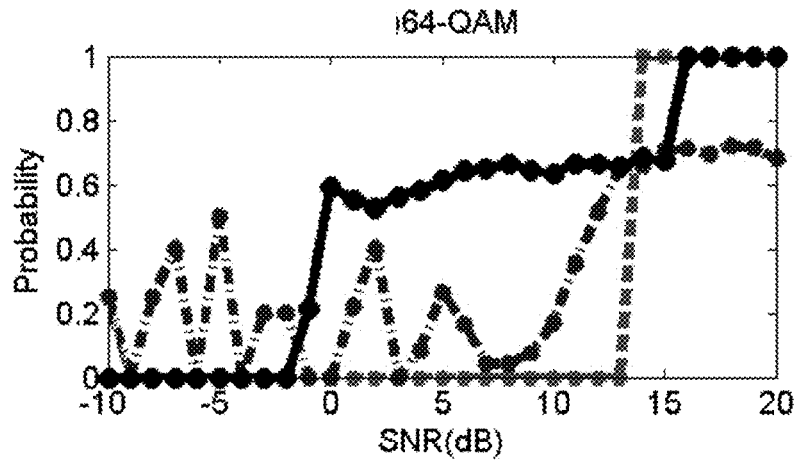
Figure 15B:
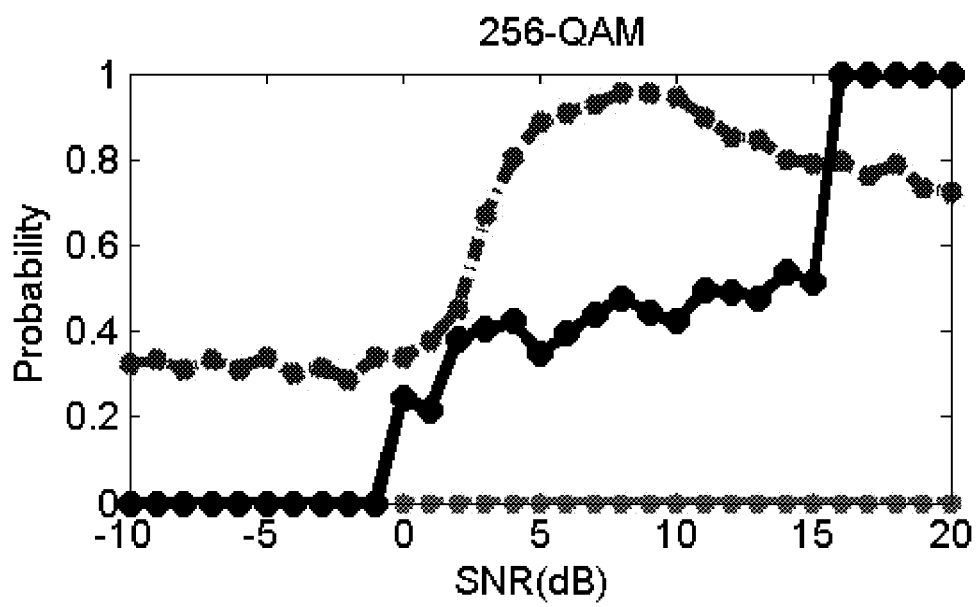
Figure 15C:
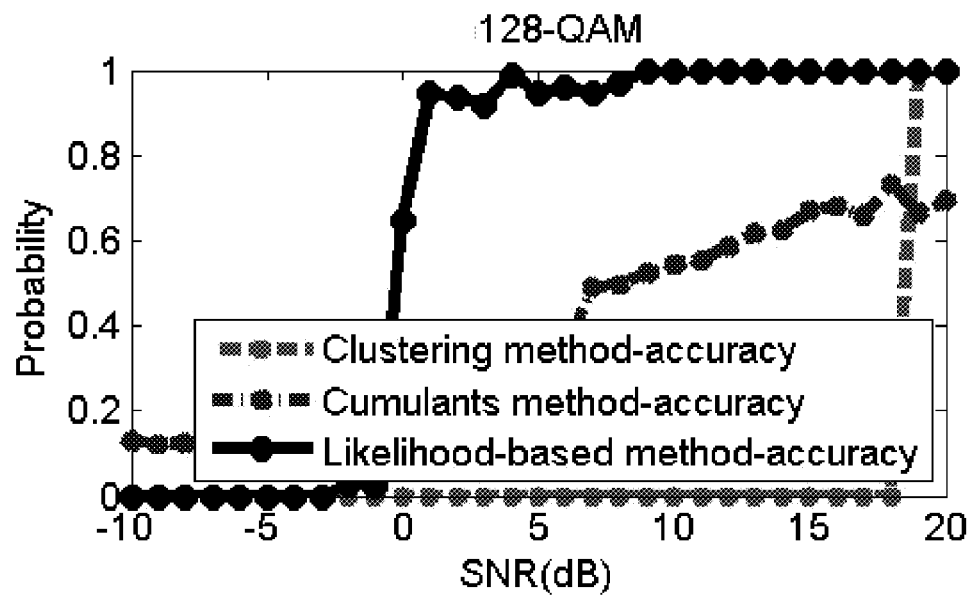
Figure 15D:
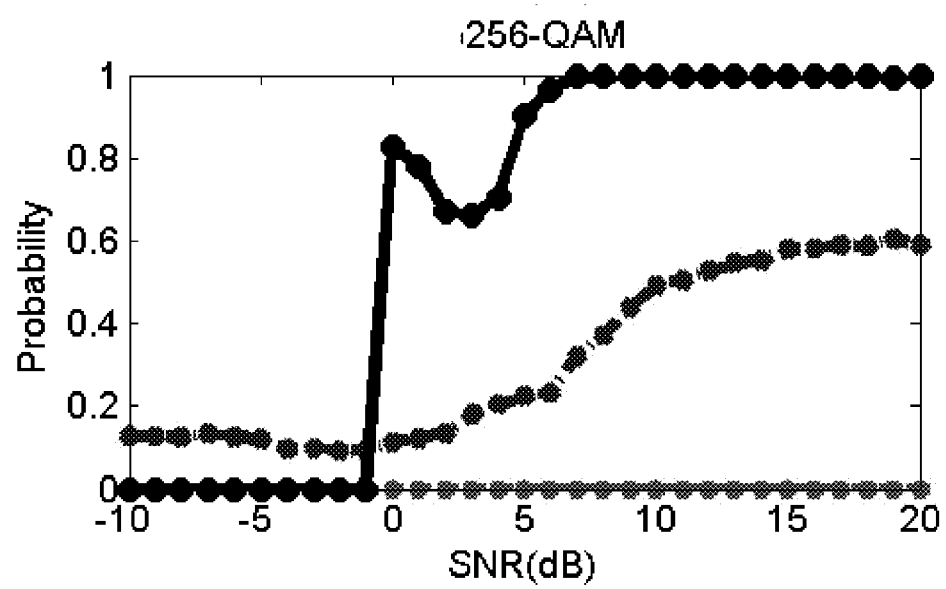

Another comparison between the clustering method, the cumulant-based method and the likelihood blind modulation identification method is shown in FIGS. 13b, 14b and 15b for each modulation type. FIGS. 13a-13f, 14a-14f and 15a-15d show the conditional probability that the input RF signal is one modulation type when the system identifies the input RF signal as that modulation type. Let the $H_M$ represent that the input RF signal is Mth modulation types and $\hat{H}_M$ represents that the system identifies the input RF signal as Mth modulation types. Then the conditional probability can be expressed as:

$$p(H_M \mid \hat{H}_M) = \frac{p(H_M \cap \hat{H}_M)}{p(\hat{H}_M)} = \frac{p(H_M \cap \hat{H}_M)}{\sum_{k=1}^{M_n} p(\hat{H}_M \mid H_k)p(H_k)} \quad (32)$$

where $p(H_M \cap \hat{H}_M) = p(\hat{H}_M \mid H_M)p(H_M)$, $p(\hat{H}_M \mid H_M)$ is the probability shown in FIGS. 13a-13f, $M_n$ is the total number of modulation types, $p(\hat{H}_M \mid H_k)$ is the probability of the system identifying the modulation type as Mth modulation type when the input RF signal is kth modulation type and $p(H)$ is the probability that the input RF signal is kth modulation types. Assuming equal probability of generating input RF signals with different modulation types, we obtain $p(H_k)=1=M_n$.

FIGS. 13a-13f, 14a-14f and 15a-15d illustrate that the likelihood blind modulation identification method disclosed herein are better at identifying modulation types than the clustering method and the cumulant-based method. The likelihood blind modulation identification method can identify different PSKs and lower-order QAMs with a high identification rate at 2-8 dB SNRs lower than the clustering method and the cumulant-based method. FIG. 13b shows that the likelihood blind modulation identification method can identify all the modulation types with 100% accuracy at SNR≥16 dB with 10,000 symbols while the clustering method and the cumulant-based method cannot.

C. Identification Results of the Simulation

In the simulations of this section, a root raised cosine filter with parameter β=0.5 was applied to the transmitted symbol sequence, the number of samples per symbol was 20, $N_s$=10,000 symbols were used, and 500 independent runs were used to calculate the probability of correct identification.

Figure 16A:
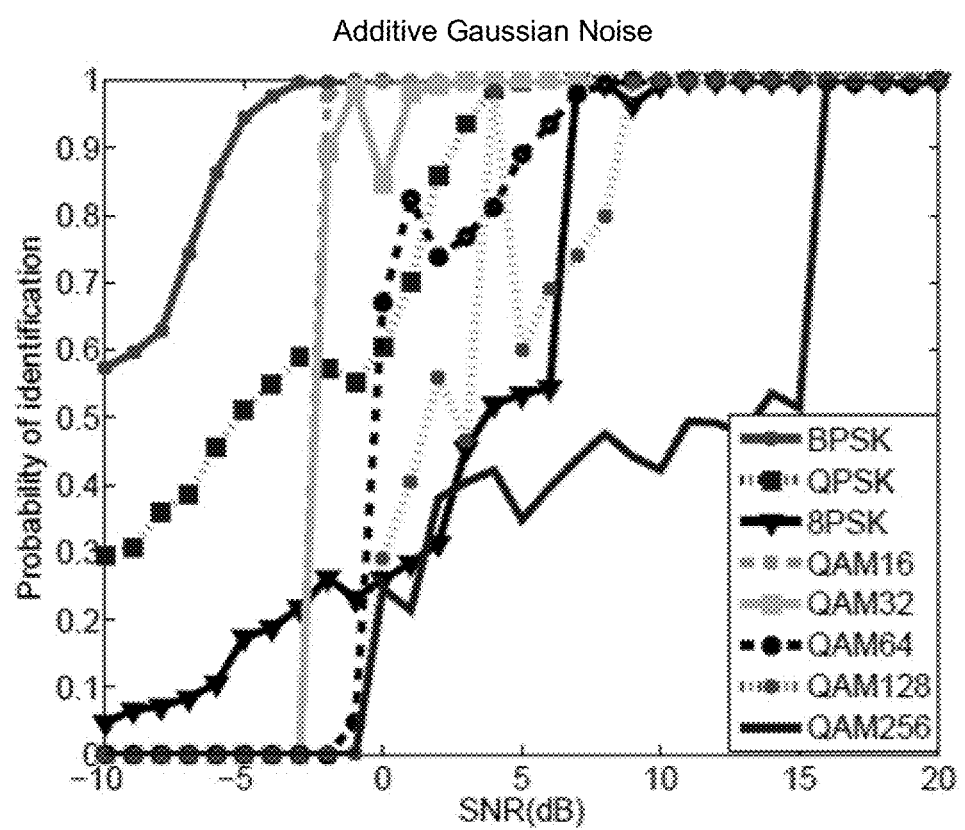
FIGS. 16a-16c illustrate a probability of correct modulation identification with different SNRs for pulse shaped signals corrupted by different noise where N=10,000.

FIG. 16a shows the identification results when the noise is zero-mean white and Gaussian noise. Shown is that the system can identify BPSK 100% when the SNR is −5 dB and classify between BPSK, QPSK and 8-PSK with 100% identification rate at SNR=5 dB. For 100% identification rate for 16-QAM, the system uses higher SNR that is 1 dB. Higher order modulation types use higher SNRs to get good performance.

Figure 16B:
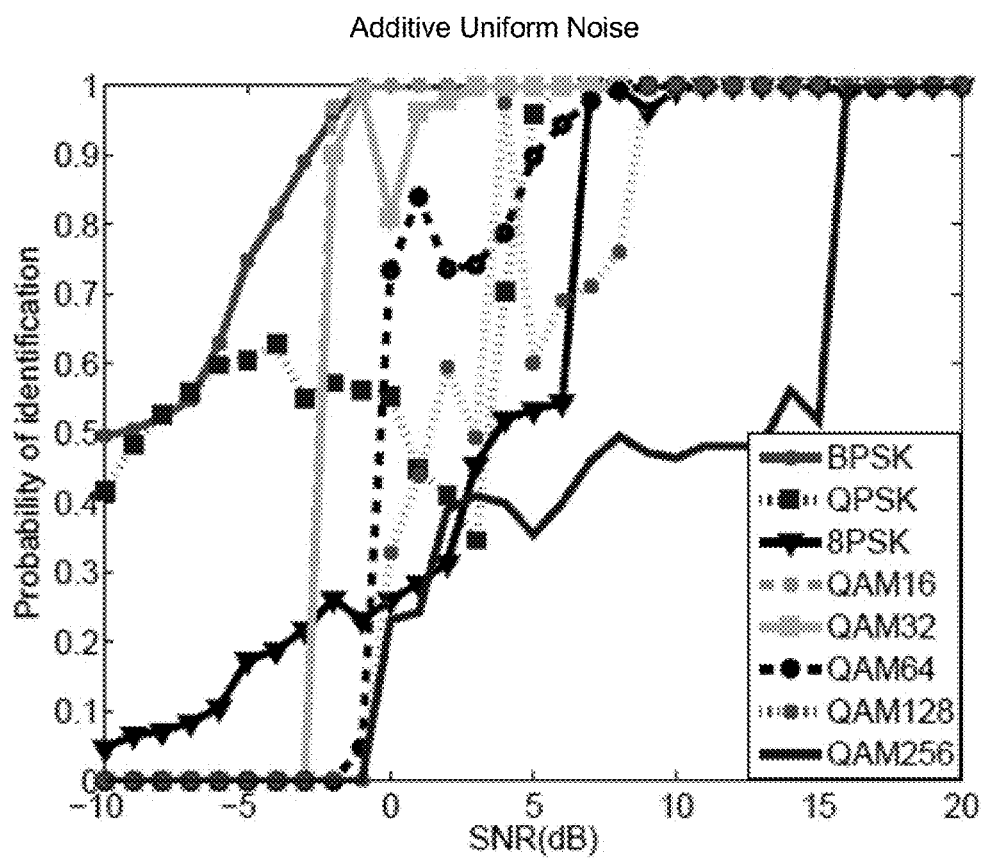
Figure 16C:
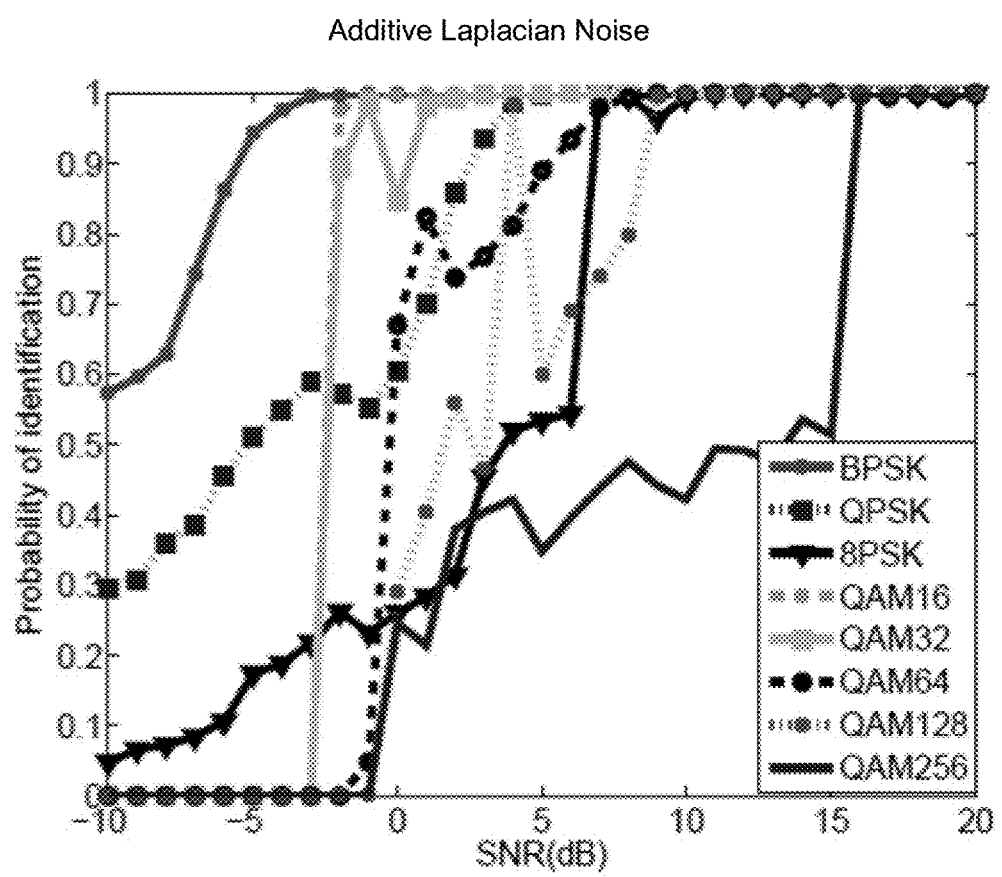

FIGS. 16b and 16c show identification results in noise environments different from the assumed Gaussian model. The noise in FIG. 16b was zero-mean and uniformly distributed noise and the results in FIG. 16c were obtained with Laplacian noise with a zero mean value. The performance with uniform noise and Laplacian noise are comparable to that with Gaussian noise.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The switch may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A blind phase-shift keying (PSK) and quadrature amplitude modulation (QAM) identification detector, having computer circuitry configured to:

non-uniformly sub-sample a received radio frequency (RF) signal for a distribution of signal amplitudes of the received RF signal;

compute a likelihood function calculation of the signal amplitudes of the sub-sampled received RF signal for each modulation type;

find a maximum value of the likelihood function calculation;

determine if a single signal amplitude results from the likelihood function;

uniform sub-sample the received RF signal when the single signal amplitude results from the likelihood function;

compute a likelihood function of observed phase differences of the sub-samples of the received RF signal of a phase sequence for each PSK modulation type when the single signal amplitude results from the likelihood function; and identify a modulation type of the received RF signal based on the maximum value of the likelihood function calculation.

2. The computer circuitry of claim 1, wherein the modulation type includes one or more of phase-shift keying (PSK), 16 quadrature amplitude modulation (QAM), 32QAM, 64QAM, 128QAM, 256QAM, 512 QAM, 1024 QAM, 2048 QAM and 4096 QAM.

3. The computer circuitry of claim 1, further configured to:

identify a PSK modulation type of the received RF signal based on the maximum value of the likelihood function calculations, wherein the PSK modulation type includes binary PSK (BPSK), quadrature PSK (QPSK), and 8PSK.

4. A method for blind identification of a received phase-shift keying (PSK) modulated radio frequency (RF) signal, comprising:

uniform sub-sampling the received RF signal to reduce a phase contribution from a carrier frequency of the received RF signal;

computing a likelihood function calculation of observed phase differences of the sub-sampled received RF signal of a phase sequence for each PSK modulation type;

finding a maximum value of the likelihood function calculation;

identifying a PSK modulation type of the received PSK modulated RF signal based on the maximum value of the likelihood function calculation;

estimating a baud rate or a symbol period;

using the estimated baud rate to generate a non-uniform sub-sampling rate;

non-uniformly sub-sampling the received RF signal at the non-uniform sub-sampling rate for a distribution of signal amplitudes of the received RF signal;

computing a likelihood function of the signal amplitudes of the sub-samples of the received RF signal for each modulation type; and match filtering the received RF signal using a square-root raised-cosine filter to differentiate between quadrature amplitude modulation (QAM) and PSK modulated RF signals.

5. The method of claim 4, further comprising:

estimating a baud rate prior to uniform sub-sampling the received RF signal, wherein uniform sub-sampling uses the estimated baud rate to generate an uniform sub-sampling rate.

6. The method of claim 4, wherein the PSK modulation type includes binary PSK (BPSK), quadrature PSK (QPSK), and 8PSK.

7. The method of claim 4, wherein the modulation type includes one or more of phase-shift keying (PSK), 16QAM, 32QAM, 64QAM, 128QAM, 256QAM, 512 QAM, 1024 QAM, 2048 QAM and 4096 QAM.

8. The method of claim 4, wherein uniform sub-sampling the received RF signal further comprises:

computing phase differences between adjacent sub-samples of the received RF signal to generate a phase difference signature for inputs of the likelihood function.

9. The method of claim 4, wherein computing the likelihood function further comprises:

computing a conditional probability density function (PDF) of a phase difference for each modulation type.

10. The method of claim 4, wherein computing the likelihood function further comprises:

estimating a phase $\theta_c$ contributed by a carrier frequency with a modulation type by maximizing a log-likelihood function over the modulation type and the phase $\theta_c$.

11. The method of claim 4, wherein blind identification provides modulation identification without a priori knowledge of a carrier frequency, a symbol rate, a baud rate, or a pulse shape of a signal transmission.

12. The method of claim 4, wherein the received RF signal is a pulsed shaped signal with additive white Gaussian noise.

* * * * *